(12) United States Patent
Takimoto et al.

(10) Patent No.: US 10,310,623 B2
(45) Date of Patent: Jun. 4, 2019

(54) INFORMATION PROCESSING DEVICE, INFORMATION PROCESSING METHOD, AND PROGRAM

(71) Applicant: SONY CORPORATION, Tokyo (JP)

(72) Inventors: Yuuji Takimoto, Kanagawa (JP); Yusuke Sakai, Kanagawa (JP); Tomohiro Ishii, Tokyo (JP); Atsushi Izumihara, Kanagawa (JP); Osamu Shigeta, Chiba (JP)

(73) Assignee: SONY CORPORATION, Tokyo (JP)

( * ) Notice: Subject to any disclaimer, the term of this patent is extended or adjusted under 35 U.S.C. 154(b) by 178 days.

(21) Appl. No.: 15/501,471

(22) PCT Filed: Aug. 31, 2015

(86) PCT No.: PCT/JP2015/004427
§ 371 (c)(1),
(2) Date: Feb. 3, 2017

(87) PCT Pub. No.: WO2016/035323
PCT Pub. Date: Mar. 10, 2016

(65) Prior Publication Data
US 2017/0228033 A1    Aug. 10, 2017

(30) Foreign Application Priority Data

Sep. 2, 2014    (JP) ................................. 2014-178592

(51) Int. Cl.
*G06F 3/0482*    (2013.01)
*G06F 3/01*    (2006.01)
(Continued)

(52) U.S. Cl.
CPC ............ *G06F 3/017* (2013.01); *G06F 3/0304* (2013.01); *G06F 3/04812* (2013.01);
(Continued)

(58) Field of Classification Search
CPC .. G06F 3/017; G06F 3/04812; G06F 3/04817; G06F 3/0482; G06F 3/167
See application file for complete search history.

(56) References Cited

U.S. PATENT DOCUMENTS

| | | | | | |
|---|---|---|---|---|---|
| 2003/0210227 | A1* | 11/2003 | Smith | ..................... | G06F 3/012 |
| | | | | | 345/157 |
| 2006/0074687 | A1* | 4/2006 | Bickel | ................... | G06F 3/0481 |
| | | | | | 704/275 |

(Continued)

FOREIGN PATENT DOCUMENTS

| | | |
|---|---|---|
| EP | 1361504 A2 | 11/2003 |
| JP | 2013-205983 | 10/2013 |

OTHER PUBLICATIONS

Xu, S., Jiang, H., and Lau, F. C. M. 2008. Personalized online document, image and video recommendation via commodity eye-tracking. In Proceedings of the 2008 ACM conference on Recommender systems (RecSys '08). ACM, New York, NY, USA, 83-90. (Year: 2008).*

(Continued)

*Primary Examiner* — Mark Edwards
(74) *Attorney, Agent, or Firm* — Paratus Law Group, PLLC

(57) ABSTRACT

There is provided an information processing device including a determination unit configured to perform determination of execution or non-execution of a manipulation based on a pause of a manipulation position specified through a manipulation of pointing to a display plane using a manipulating body at a position apart from the display plane, and a control unit configured to issue a command corresponding to the manipulation when the determination unit determines execution of the manipulation.

20 Claims, 21 Drawing Sheets

(51) Int. Cl.
  *G06F 3/03* (2006.01)
  *G06F 3/0481* (2013.01)
  *G06F 3/0484* (2013.01)
  *G06F 3/16* (2006.01)

(52) U.S. Cl.
  CPC ...... *G06F 3/04815* (2013.01); *G06F 3/04842* (2013.01); *G06F 3/0482* (2013.01); *G06F 3/04817* (2013.01); *G06F 3/167* (2013.01)

(56) References Cited

U.S. PATENT DOCUMENTS

| | | | |
|---|---|---|---|
| 2006/0166681 A1* | 7/2006 | Lohbihler | G01S 5/02 455/456.2 |
| 2012/0257035 A1* | 10/2012 | Larsen | G06F 3/013 348/78 |
| 2013/0185679 A1* | 7/2013 | Fretwell | G06F 3/017 715/862 |
| 2013/0190093 A1* | 7/2013 | Wohlstadter | G06F 3/011 463/39 |
| 2014/0168062 A1 | 6/2014 | Katz et al. | |

OTHER PUBLICATIONS

Jacob, The Use of Eye Movements in Human-Computer Interaction Techniques: What You Look at is What You Get, ACM Transactions on Information Systems, Apr. 1991, pp. 152-169, vol. 9, No. 3.
Mar. 13, 2018, European Communication issued for related EP Application No. 15763659.8.
Oct. 31, 2018, European summons to attend oral proceedings issued for related EP Application No. 15763659.8.

\* cited by examiner

[Fig. 1]
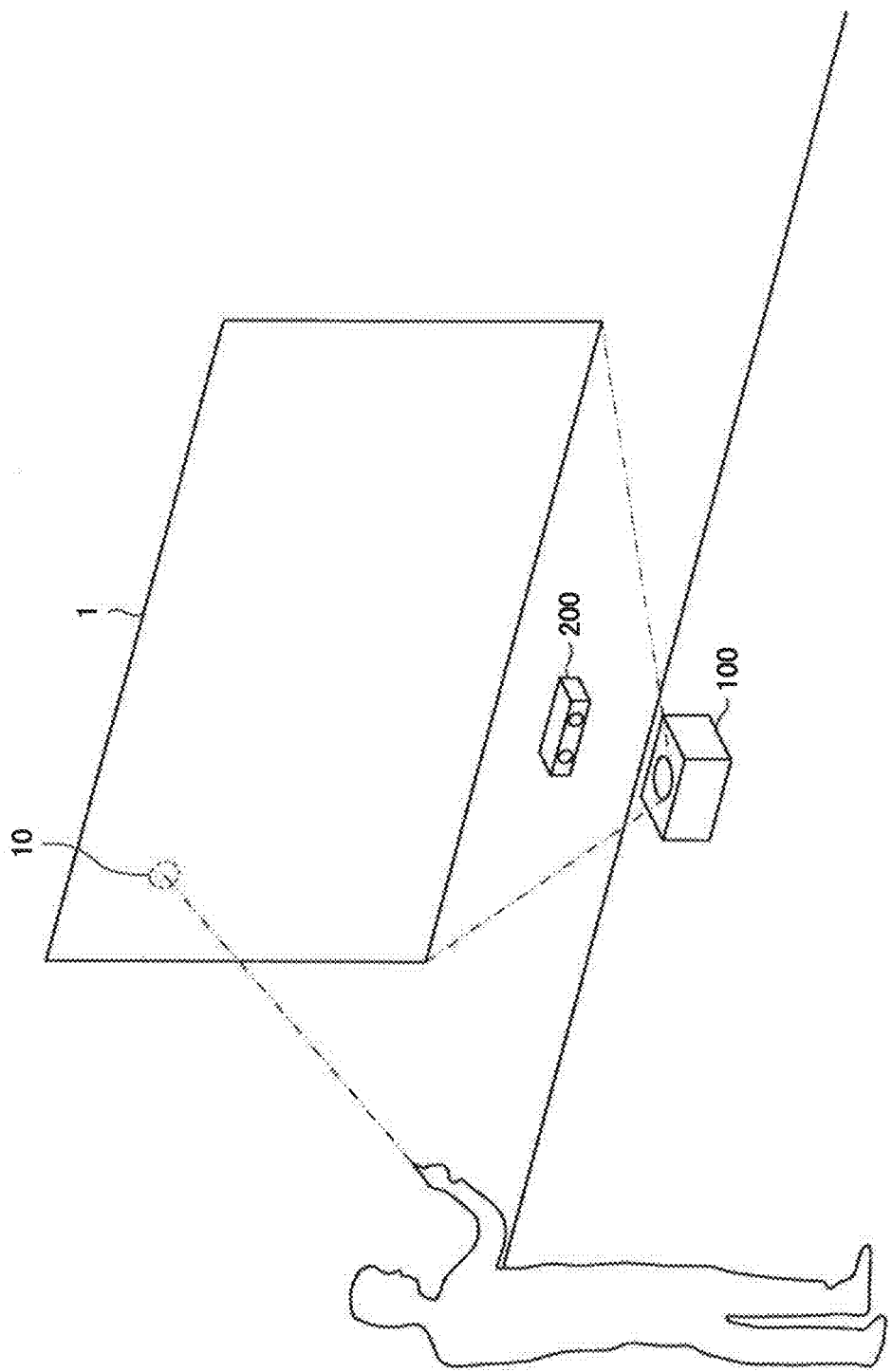

[Fig. 2]
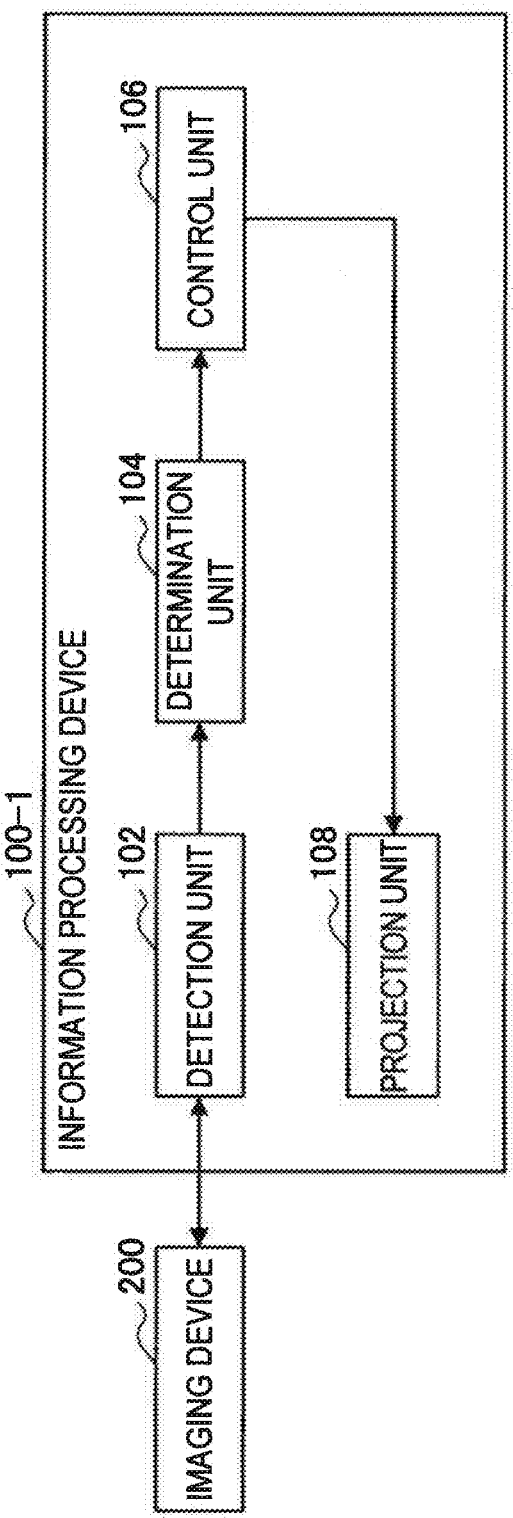

[Fig. 3]
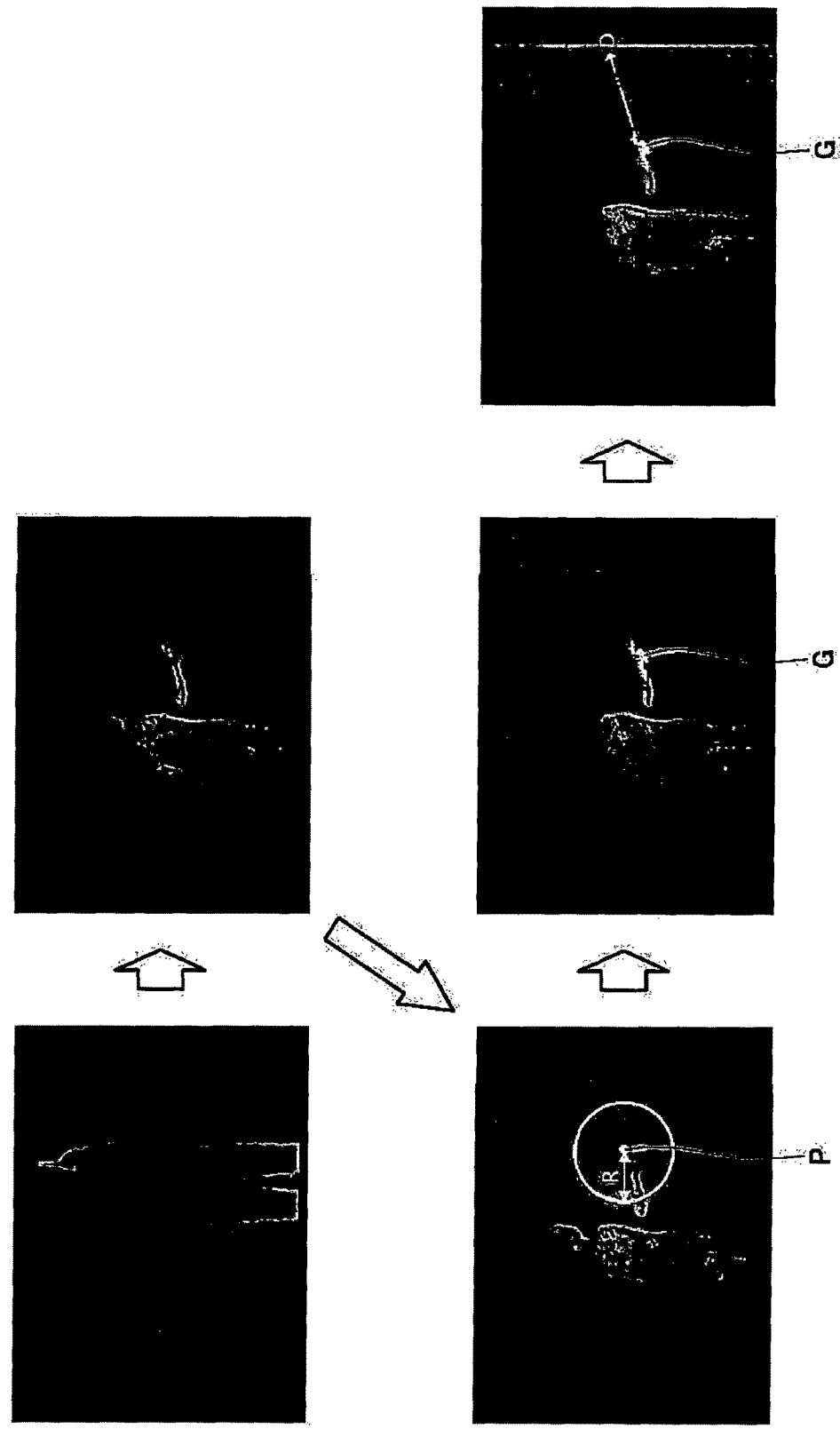

[Fig. 4]
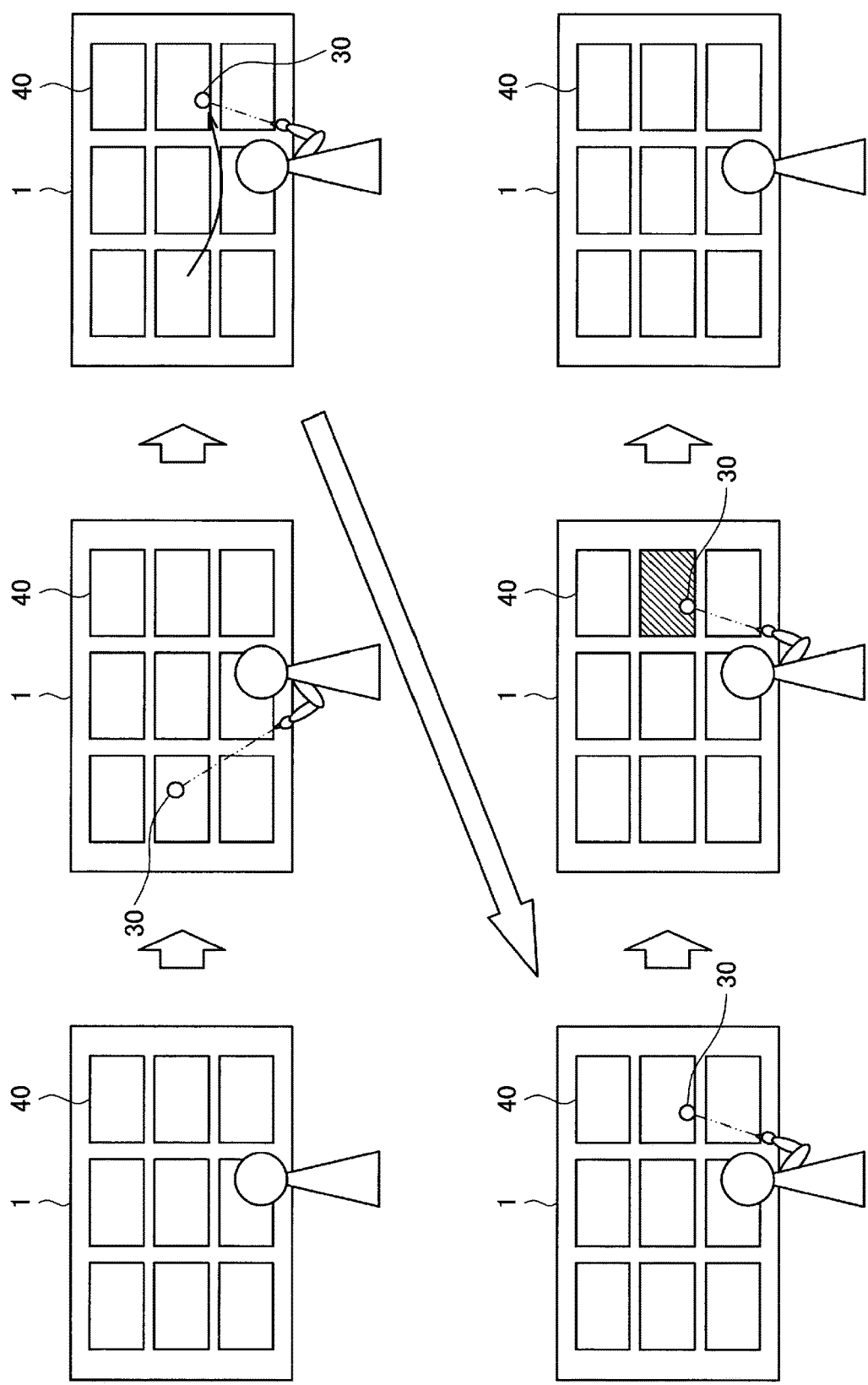

[Fig. 5]
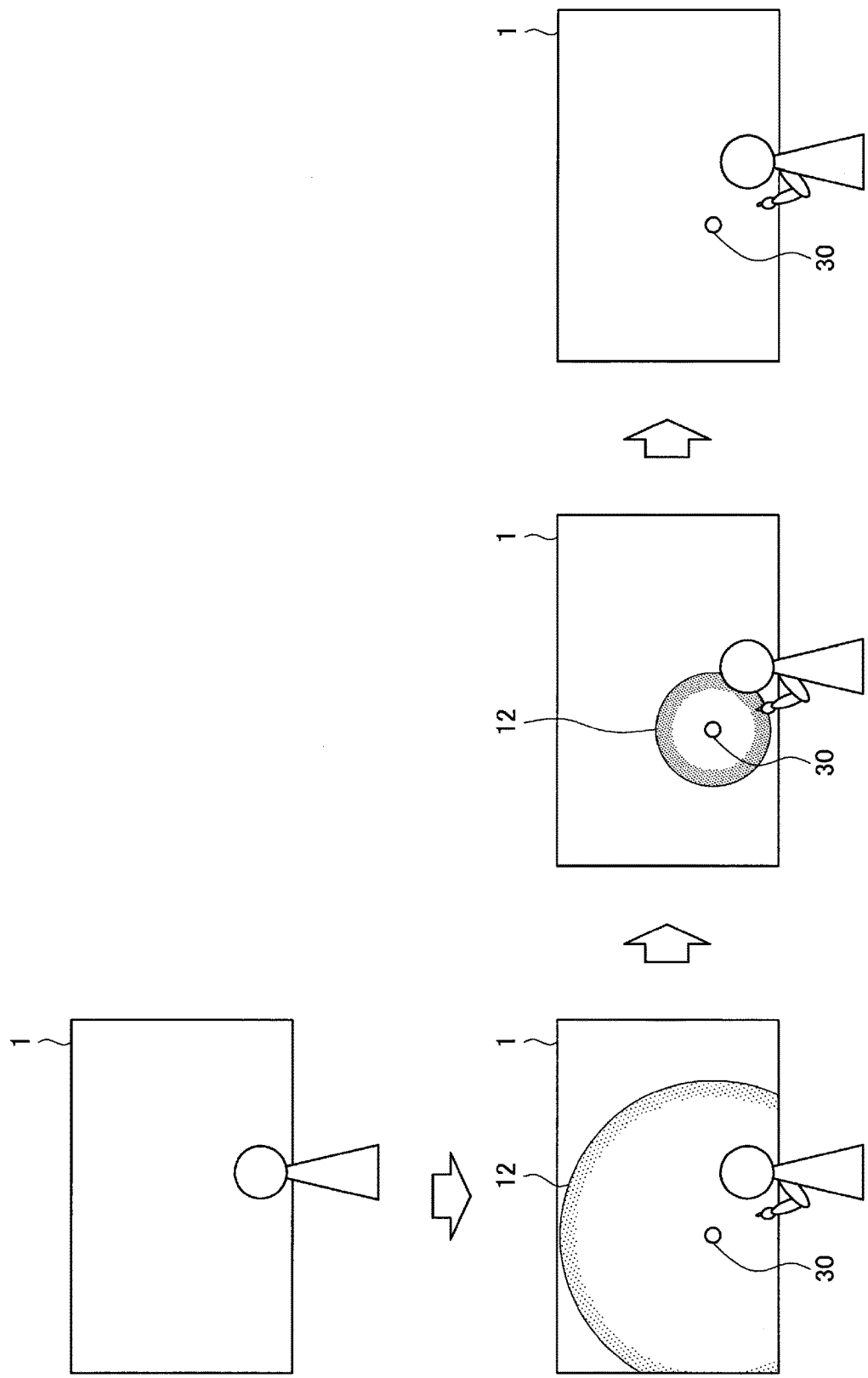

[Fig. 6]
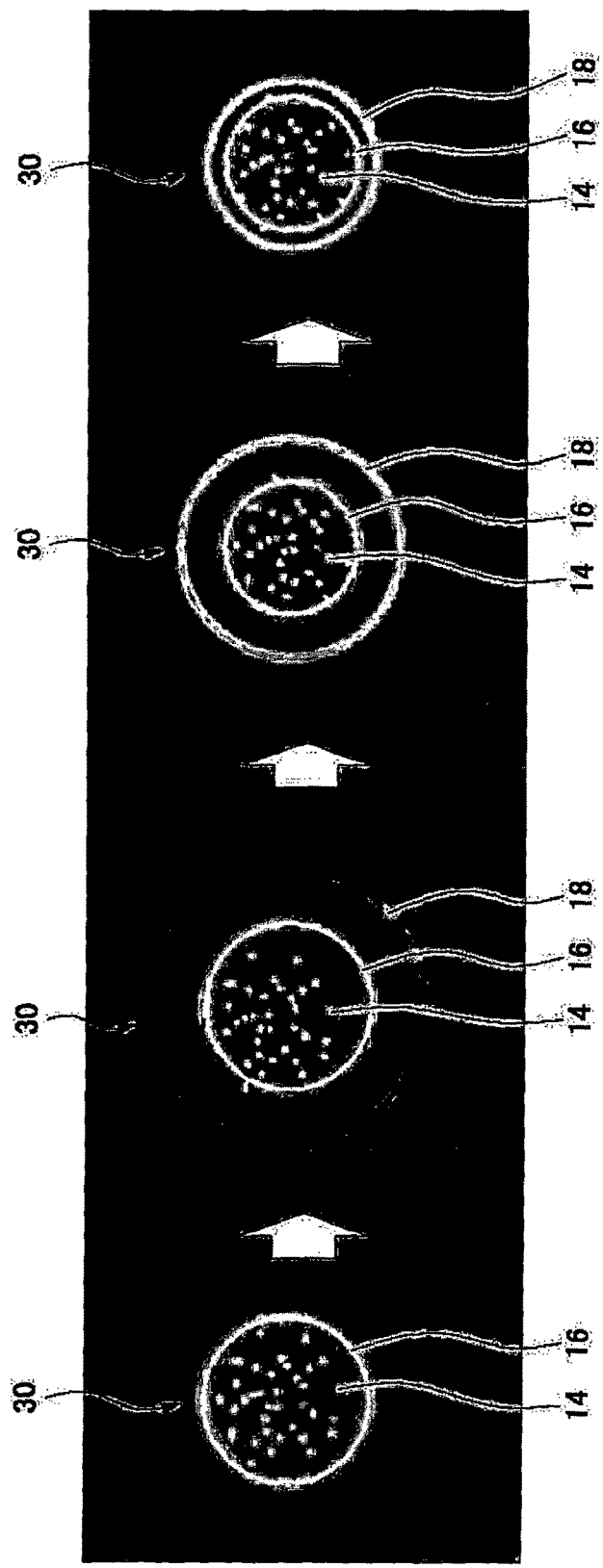

[Fig. 7]
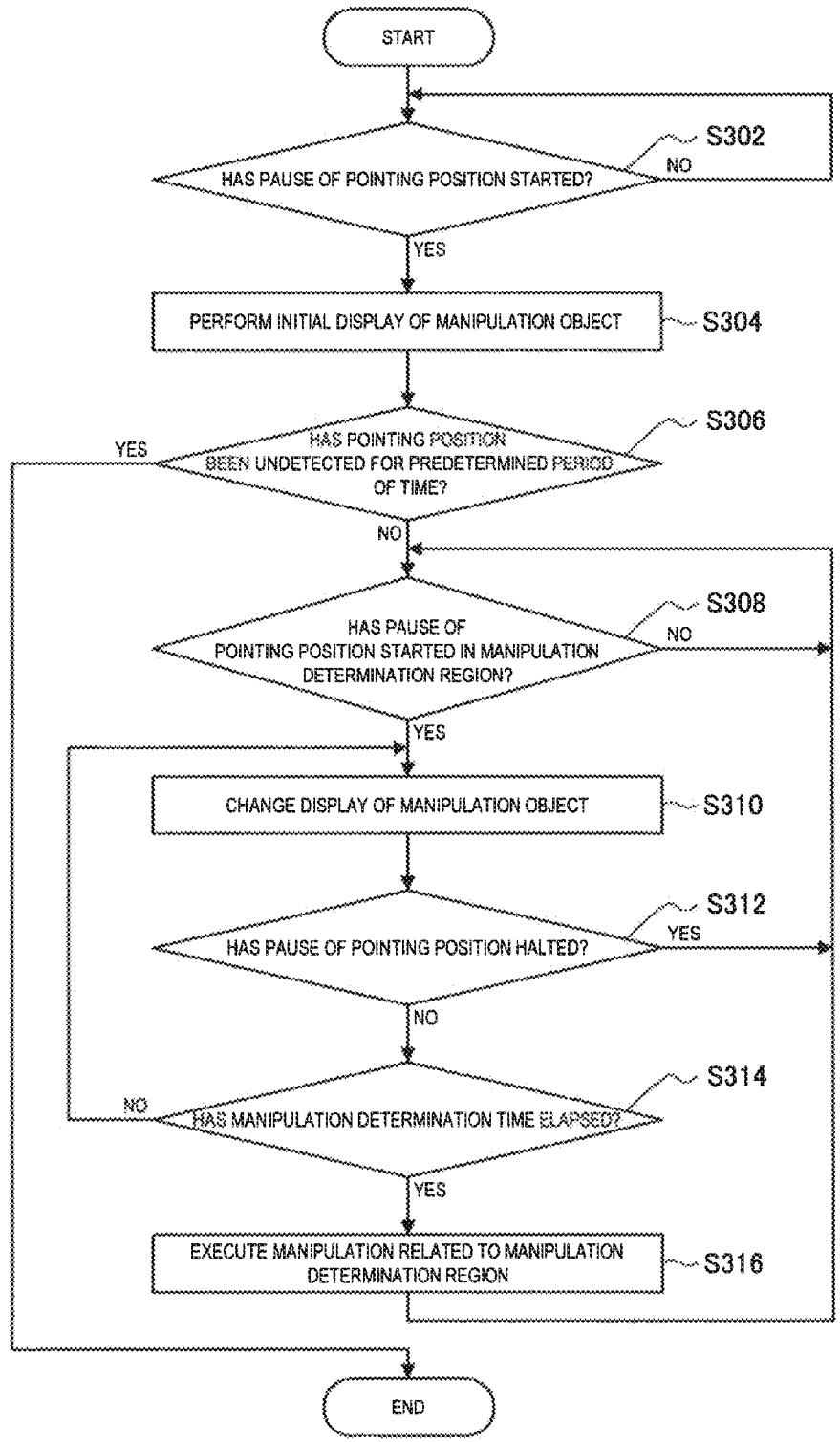

[Fig. 8A]
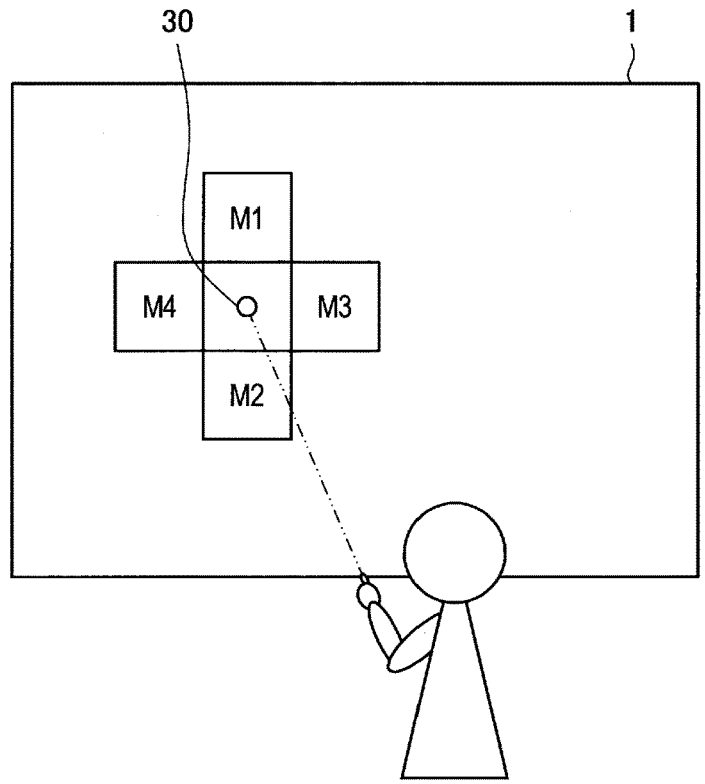
[Fig. 8B]
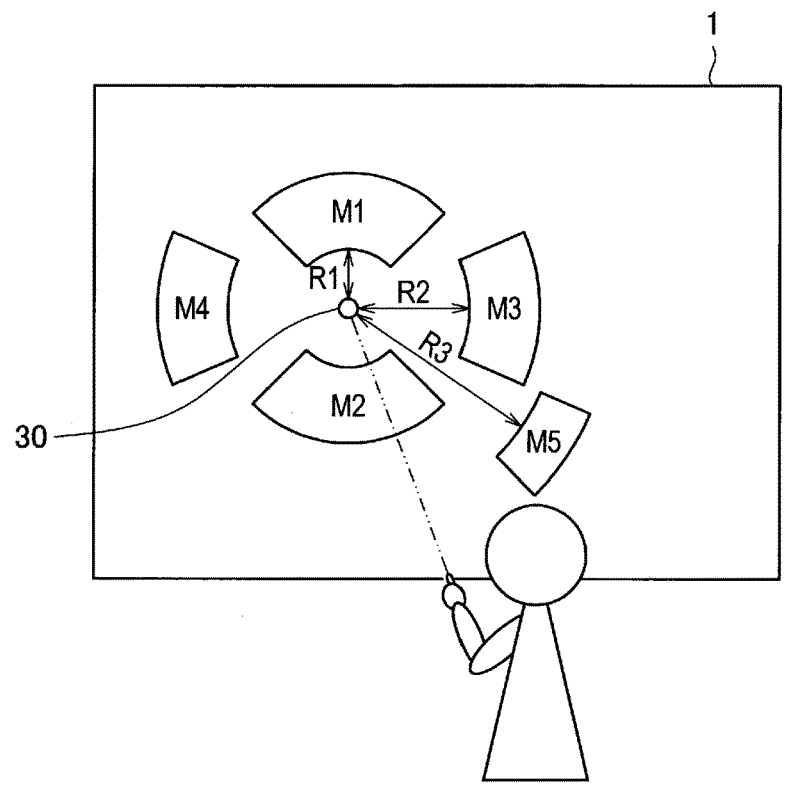

[Fig. 9]
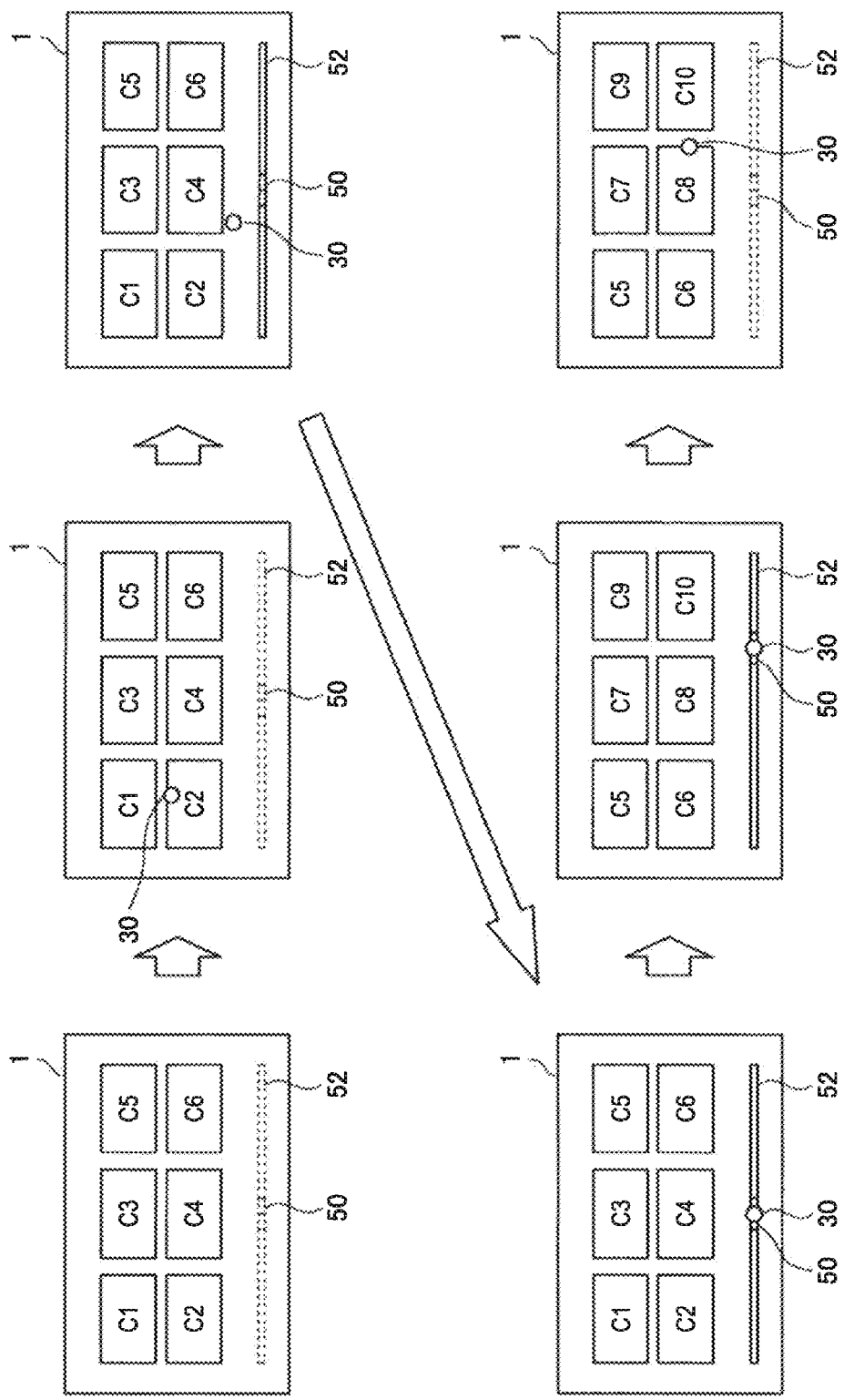

[Fig. 10]
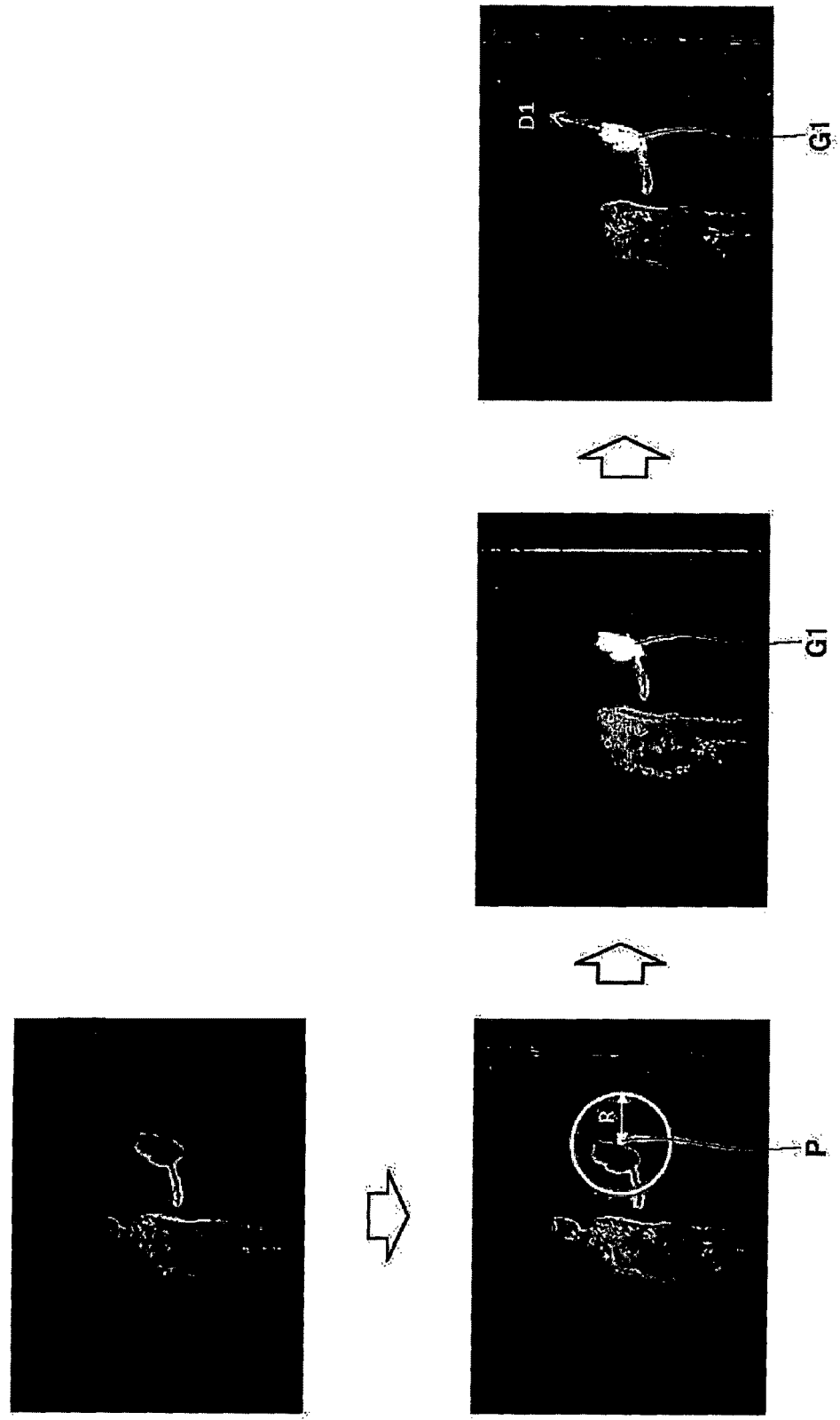

[Fig. 11]
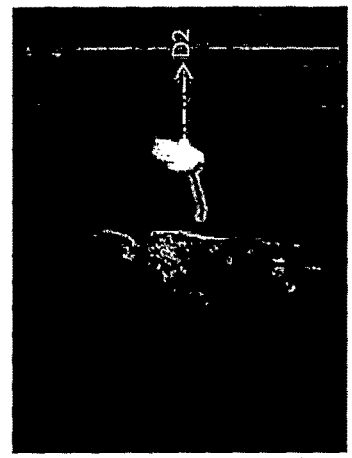

[Fig. 12]
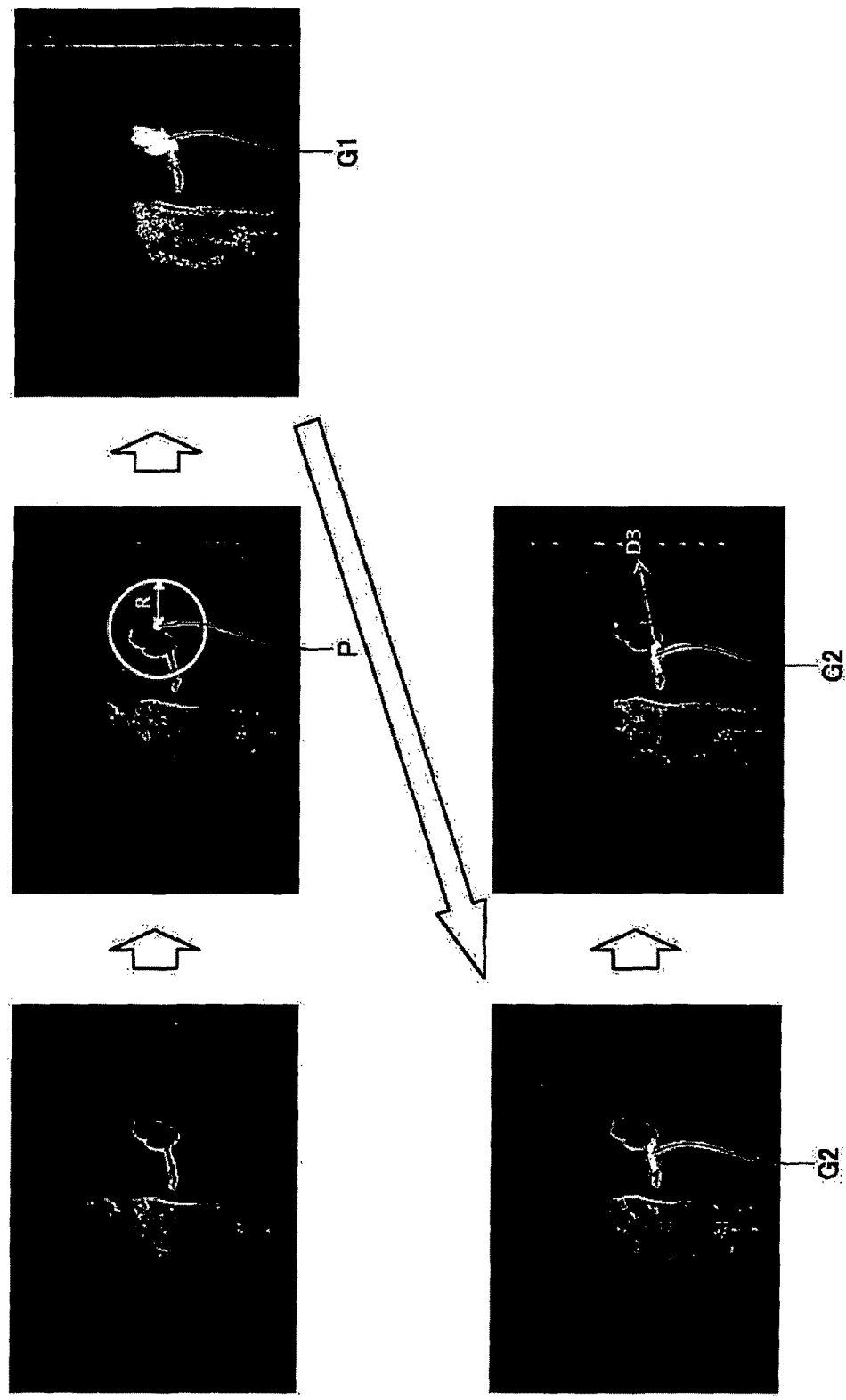

[Fig. 13]
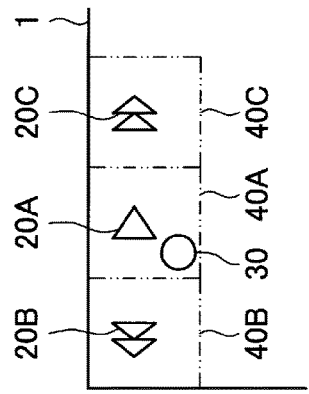
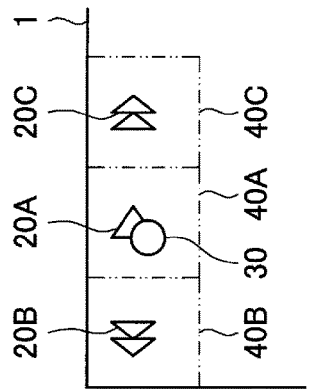
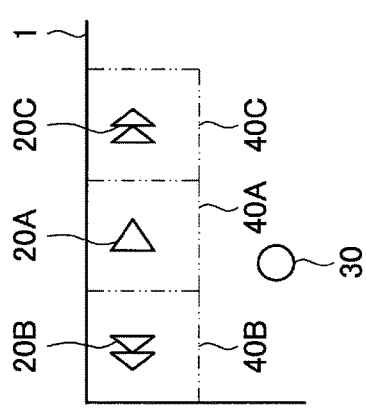

[Fig. 14]
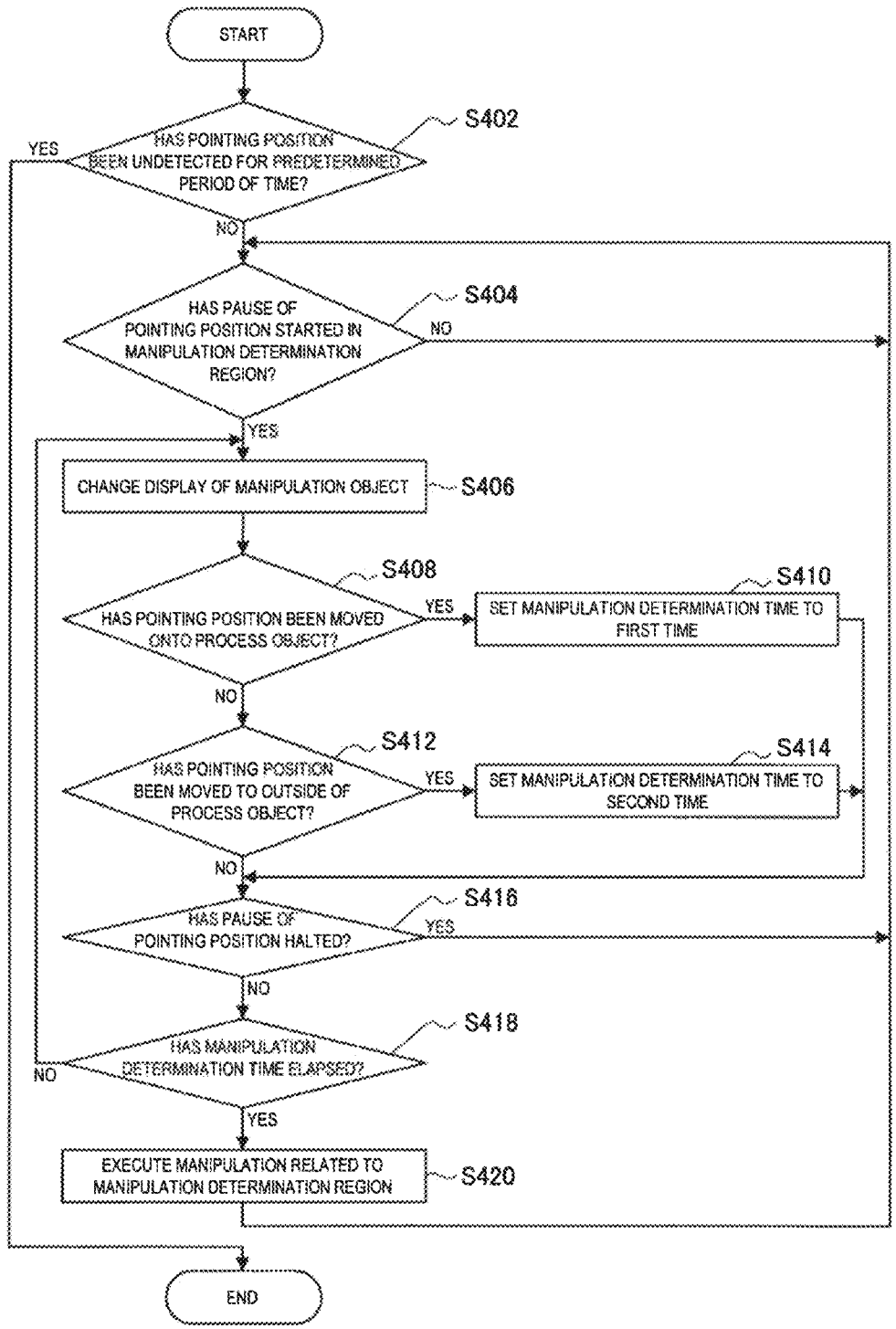

[Fig. 15]
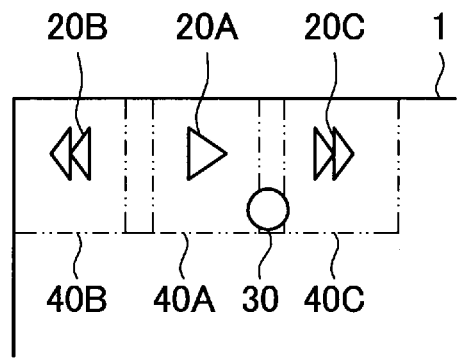
[Fig. 16]
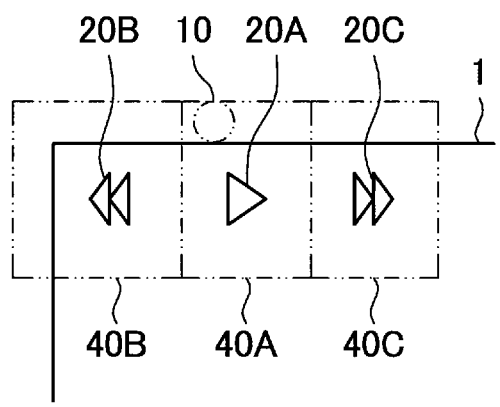
[Fig. 17A]
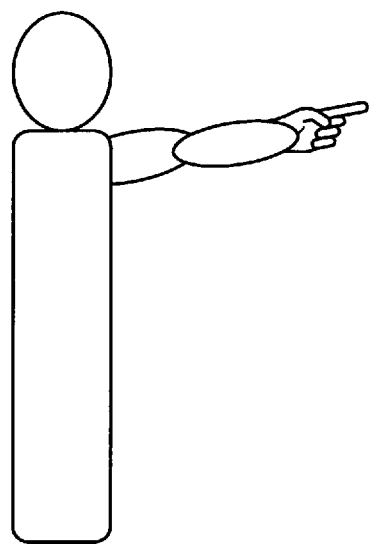

[Fig. 17B]
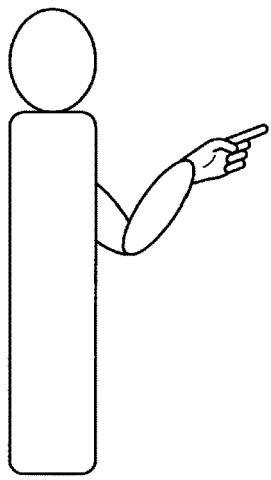
[Fig. 17C]
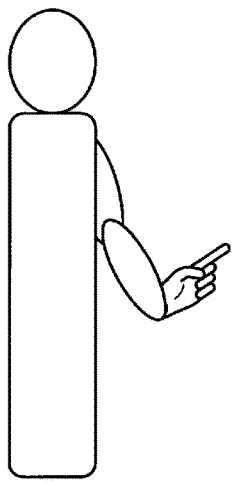
[Fig. 18]
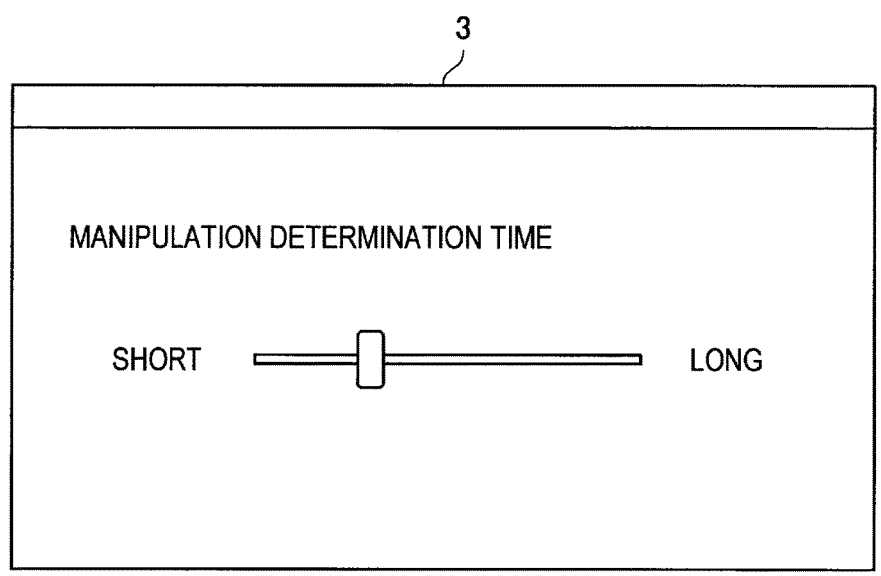

[Fig. 19]
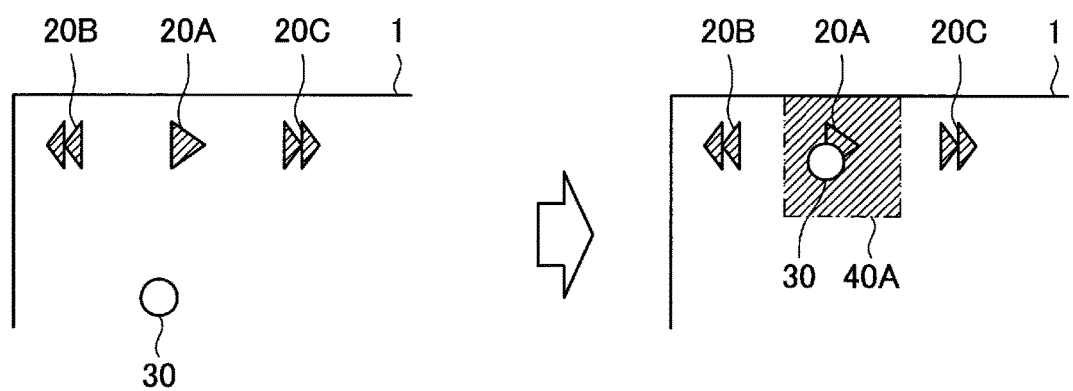

[Fig. 20]
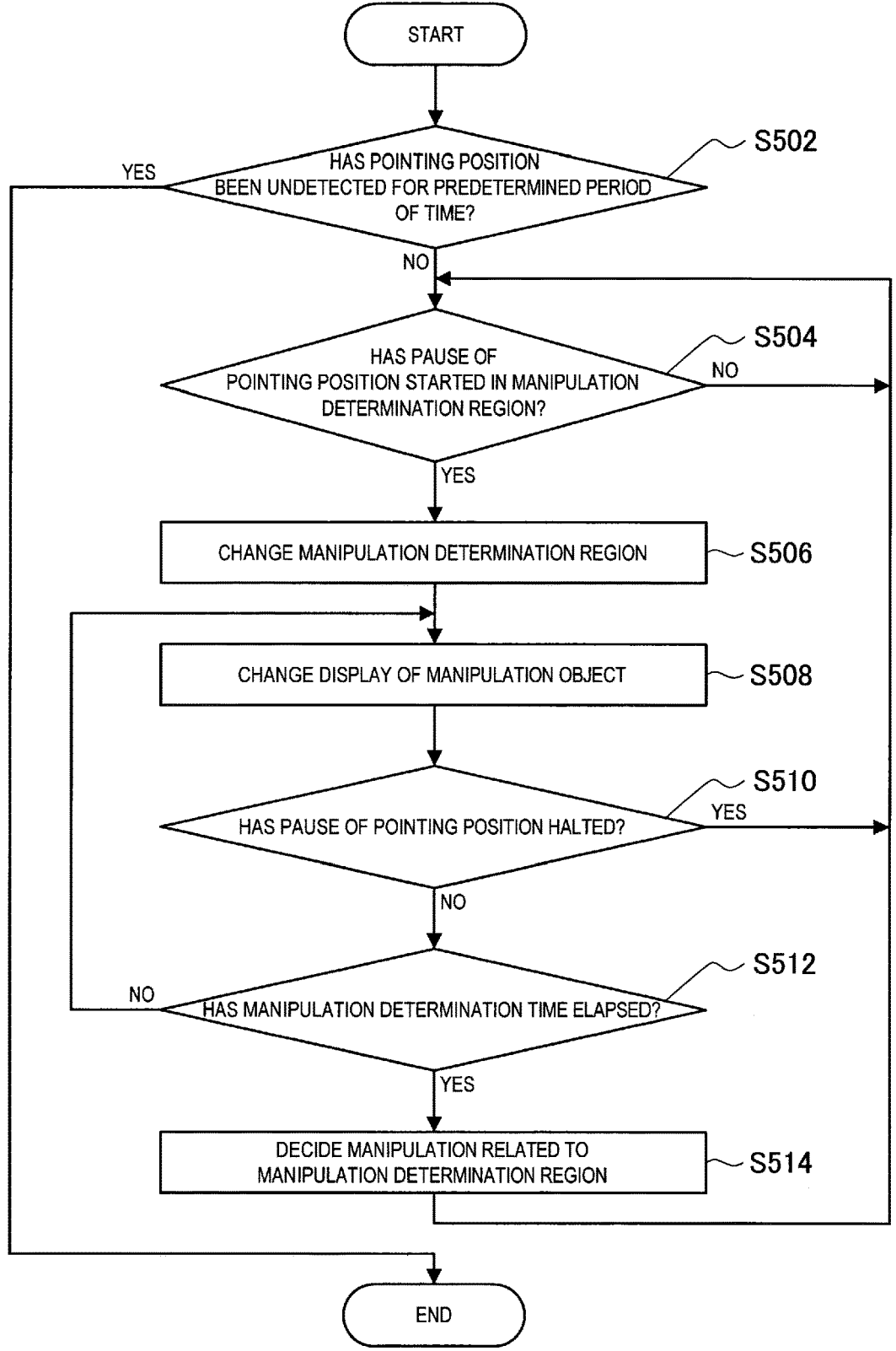

[Fig. 21]
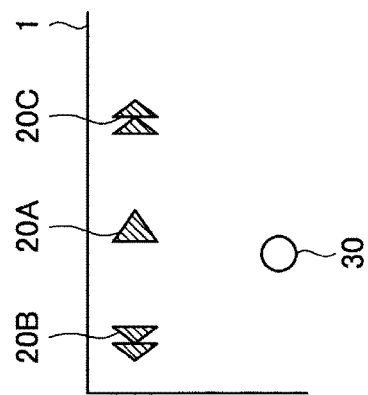
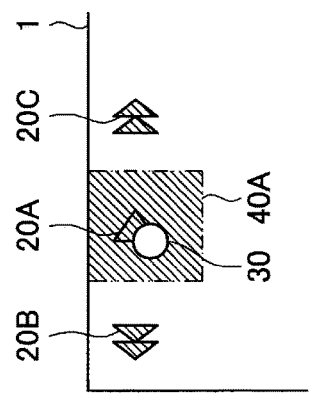
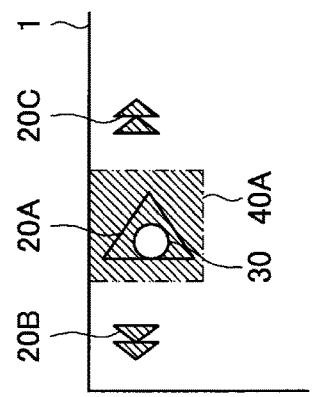

[Fig. 22]
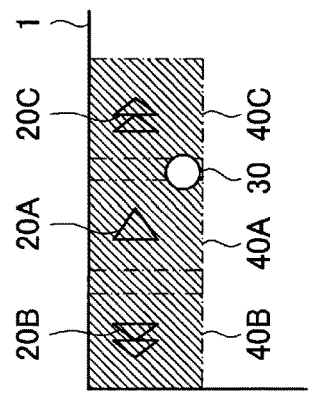
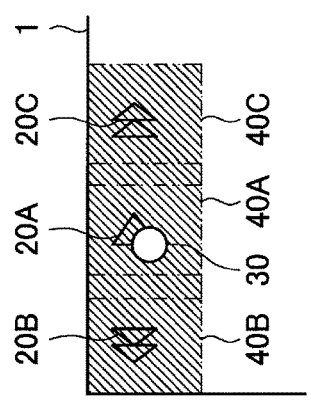
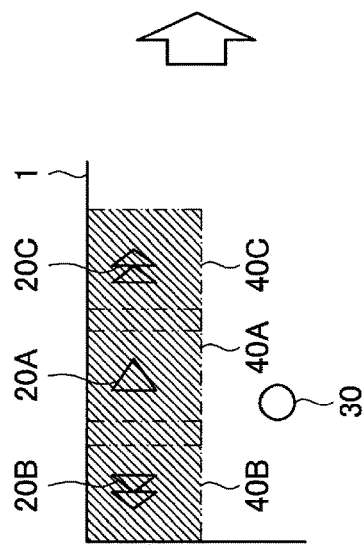

[Fig. 23]
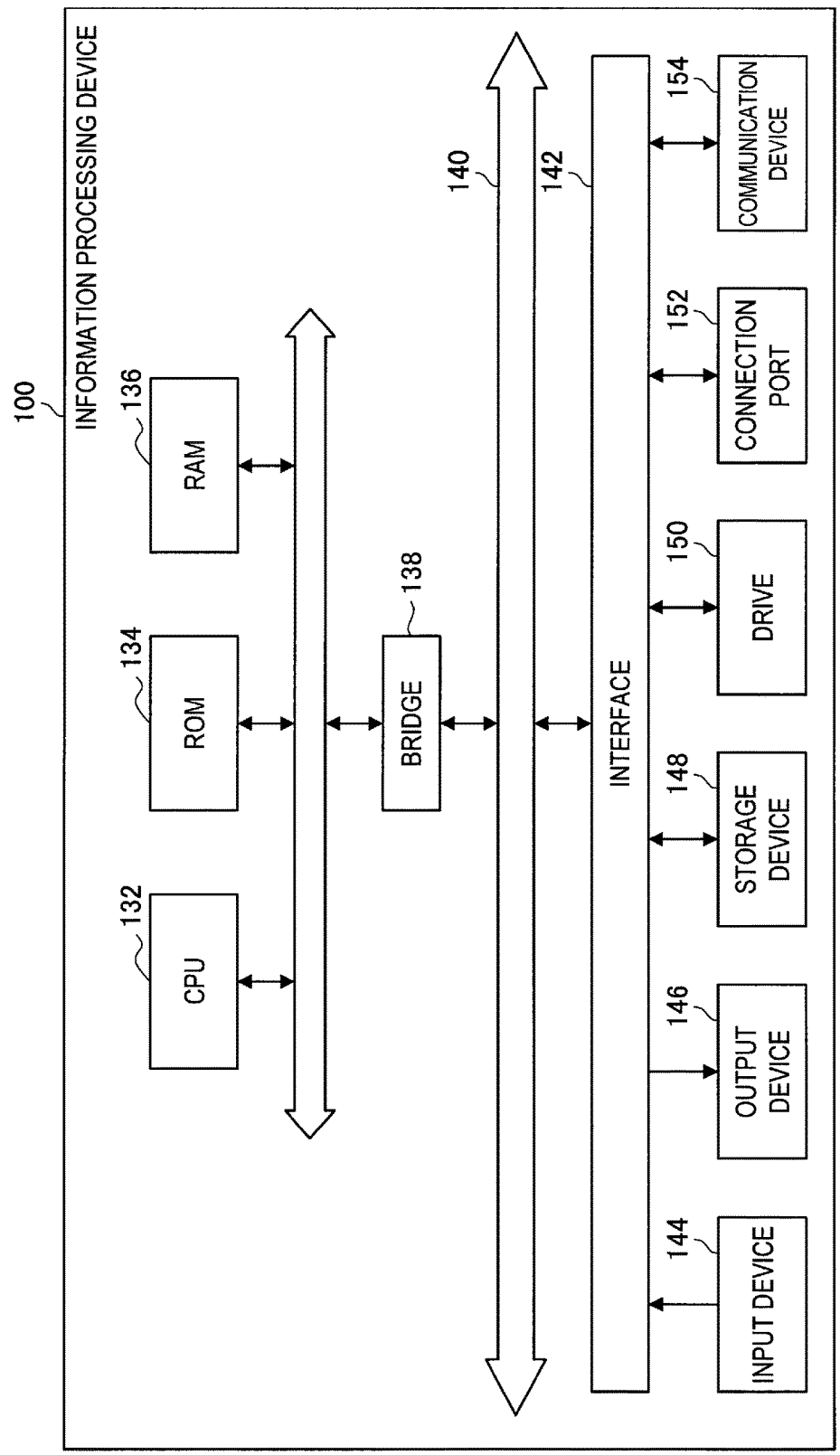

INFORMATION PROCESSING DEVICE, INFORMATION PROCESSING METHOD, AND PROGRAM

CROSS REFERENCE TO RELATED APPLICATIONS

This application is a National Stage Patent Application of PCT International Patent Application No. PCT/JP2015/004427 filed Aug. 31, 2015, under 35 U.S.C. § 371, which claims the benefit of Japanese Priority Patent Application JP 2014-178592 filed Sep. 2, 2014, the entire contents of which are incorporated herein by reference.

TECHNICAL FIELD

The present disclosure relates to an information processing device, an information processing method, and a program.

BACKGROUND ART

Recently, as technologies of detecting attitudes or motions (hereinafter also referred to as gestures) of human beings have progressed, technologies of manipulating devices and the like based on gestures of users have been developed. Particularly, a technology in which a manipulation for designating a position by a manipulating body a user manipulates (hereinafter also referred to as a pointing manipulation) is recognized and an operation of a device is controlled based on the recognized pointing manipulation is generally known.

For example, PTL1 discloses a technology related to an information processing device which recognizes gestures of a hand of a user based on learned three-dimensional model data of human bodies. According to the technology of PTL1, a pointing manipulation can be detected based on a recognized gesture of a hand of a user, and a position designated through the detected pointing manipulation can be specified.

CITATION LIST

Patent Literature

[PTL 1]
JP 2013-205983A

SUMMARY

Technical Problem

Here, in the related art disclosed in PTL1, however, it is difficult to perform an additional manipulation at a position designated through a pointing manipulation (hereinafter also referred to as a pointing position), for example, a manipulation that is equivalent to a release manipulation or the like after a touching manipulation performed in a manipulation with respect to a touch panel.

Thus, the present disclosure proposes a novel and improved information processing device, information processing method, and program which can operate so that additional manipulations that match intentions of users are executed.

Solution to Problem

According to an embodiment of the present disclosure, there is provided an information processing device including a determination unit configured to perform determination of execution or non-execution of a manipulation based on a pause of a manipulation position specified through a manipulation of pointing to a display plane using a manipulating body at a position apart from the display plane, and a control unit configured to issue a command corresponding to the manipulation when the determination unit determines execution of the manipulation.

According to another embodiment of the present disclosure, there is provided an information processing method including performing determination of execution or non-execution of a manipulation based on a pause of a manipulation position specified through a manipulation of pointing to a display plane using a manipulating body at a position apart from the display plane, and issuing a command corresponding to the manipulation when execution of the manipulation is determined.

According to still another embodiment of the present disclosure, there is provided a program for causing a computer to execute a determination function of performing determination of execution or non-execution of a manipulation based on a pause of a manipulation position specified through a manipulation of pointing to a display plane using a manipulating body at a position apart from the display plane, and a control function of issuing a command corresponding to the manipulation when the execution of the manipulation is determined in the determination function.

Advantageous Effects of Invention

According to one or more of embodiments of the present disclosure as described above, an information processing device, an information processing method, and a program which can operate so that additional manipulations that match intentions of users are executed are provided. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram for describing an overview of an information processing device according to an embodiment of the present disclosure.

FIG. 2 is a block diagram illustrating a schematic functional configuration of an information processing device according to a first embodiment of the present disclosure.

FIG. 3 is a diagram illustrating an example of the flow of a detection process of a pointing position of the information processing device according to the embodiment.

FIG. 4 is a diagram illustrating an example of a display change in a display region according to a process of the information processing device according to the embodiment.

FIG. 5 is a diagram illustrating an example of initial display of a manipulation object in the process of the information processing device according to the embodiment.

FIG. 6 is a diagram illustrating an example of a display change of a manipulation object according to the process of the information processing device according to the embodiment.

FIG. 7 is a flow chart conceptually showing a process of the information processing device according to the embodiment.

FIG. 8A is a diagram for describing a menu manipulation displayed by an information processing device of the related art.

FIG. 8B is a diagram illustrating an example of display of a process menu in a process of an information processing device according to a second modified example of the embodiment.

FIG. 9 is a diagram illustrating an example of a display change according to a scrolling process of the information processing device according to the second modified example of the embodiment.

FIG. 10 is a diagram for describing a detection process of a pointing position when a hand of a user is opened toward a display region with respect to the information processing device of the related art.

FIG. 11 is a diagram for describing an example of a detection process of a pointing position when a hand of a user is opened toward a display region with respect to an information processing device according to a third modified example of the embodiment.

FIG. 12 is a diagram for describing another example of the detection process of the pointing position when a hand of the user is opened toward the display region with respect to the information processing device according to the third modified example of the embodiment.

FIG. 13 is a diagram for describing a change in a manipulation determination time according to a process of an information processing device according to a second embodiment of the present disclosure.

FIG. 14 is a flow chart conceptually showing the process of the information processing device according to the embodiment.

FIG. 15 is a diagram illustrating an example of a setting of manipulation determination regions in a process of the information processing device according to a first modified example of the embodiment.

FIG. 16 is a diagram illustrating another example of the setting of the manipulation determination regions in the process of the information processing device according to a second modified example of the embodiment.

FIG. 17A is a diagram illustrating an example of a form of a pointing manipulation in a process of the information processing device according to a third modified example of the embodiment.

FIG. 17B is a diagram illustrating another example of the form of the pointing manipulation in the process of the information processing device according to the third modified example of the embodiment.

FIG. 17C is a diagram illustrating still another example of the form of the pointing manipulation in the process of the information processing device according to the third modified example of the embodiment.

FIG. 18 is a diagram illustrating an example of a GUI for setting a manipulation determination time displayed by the information processing device according to a fifth modified example of the embodiment.

FIG. 19 is a diagram for describing a change in a manipulation determination region according to a process of an information processing device according to a third embodiment of the present disclosure.

FIG. 20 is a flow chart conceptually showing the process of the information processing device according to the embodiment.

FIG. 21 is a diagram illustrating an example of a display change of a process object resulting from a change in a manipulation determination region according to a process of the information processing device according to a first modified example of the embodiment.

FIG. 22 is a diagram for describing a manipulation determination process when manipulation determination regions overlap in the information processing device according to a second modified example of the embodiment.

FIG. 23 is an explanatory diagram illustrating a hardware configuration of the information processing device according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview of an information processing device according to an embodiment of the present disclosure
2. First embodiment (Example of a display control according to an elapsed time of a pause)
2-1. Configuration of an information processing device
2-2. Process of the information processing device
2-3. Modified example
3. Second embodiment (Example in which a manipulation determination time is changed)
3-1. Configuration of an information processing device
3-2. Process of the information processing device
3-3. Modified examples
4. Third embodiment (Example in which a manipulation determination region is changed)
4-1. Configuration of an information processing device
4-2. Process of the information processing device
4-3. Modified example
5. Hardware configuration of the information processing device according to an embodiment of the present disclosure
6. Conclusion

1. Overview of an Information Processing Device According to an Embodiment of the Present Disclosure First, an overview of an information processing device according to an embodiment of the present disclosure will be described with reference to FIG. 1. FIG. 1 is a diagram for describing the overview of the information processing device according to the embodiment of the present disclosure.

The information processing device 100 according to the embodiment of the present disclosure has a manipulation detection function and a display control function. The manipulation detection function is a process of recognizing gestures of users and detecting manipulations which correspond to the gestures. Particularly, with the manipulation detection function, a pointing manipulation performed in a region in which a display object can be displayed (hereinafter also referred to as a display region or a display plane) is detected. In addition, the display control function is a function of controlling content to be displayed in a display device or the like according to a manipulation. Owing to these functions, the information processing device 100 can change display content according to a pointing manipulation detected from a gesture of a user. Note that the information processing device 100 can include a display device or the like.

Then, at a pointing position 10 related to the detected pointing manipulation, the information processing device 100 can cause a cursor indicating the pointing position 10 to be displayed.

Here, when a user who performs the manipulations is far apart from the imaging device 200, it is generally difficult to specify a fine gesture, for example, thrusting a hand forward, holding a finger, or the like. For this reason, determination of a manipulation is made only based on a pointing manipulation; however, in a pointing manipulation, it is difficult to determine an additional manipulation that is made at a pointing position, for example, a manipulation equivalent to a release manipulation after a touching manipulation in a touch panel manipulation or the like.

Thus, the information processing device 100 according to the embodiment of the present disclosure makes the determination of execution or non-execution of a manipulation based on a pause of a manipulation position that is specified through a manipulation in which a display plane is pointed to using a manipulating body at a position apart from the display plane, i.e., a pointing position, and when the execution of the manipulation is determined, issues a command corresponding to the manipulation.

For example, the information processing device 100 determines a pause of the pointing position 10 illustrated in FIG. 1. Then, when a predetermined period of time is determined to have elapsed from the start of the pause of the pointing position 10, the information processing device 100 issues a command corresponding to the pause position of the pointing position 10, for example, a display object selection command.

As described above, the information processing device 100 according to the embodiment of the present disclosure makes the determination of execution or non-execution of a manipulation based on a pause of the pointing position, and issues a command corresponding to the manipulation. For this reason, as an additional manipulation is realized according to the pause of the pointing position, the additional manipulation according to an intention of a user is executed by the information processing device 100.

2. First Embodiment (Example of a Display Control According to an Elapsed Time of a Pause)

The overview of the information processing device 100 according to the embodiment of the present disclosure has been described above. Next, an information processing device 100-1 according to a first embodiment of the present disclosure will be described. The information processing device 100-1 changes the display of a display object related to a pointing position according to an elapsed time of a pause of the pointing position.

2-1. Configuration of an Information Processing Device

First, a configuration of the information processing device 100-1 according to the first embodiment of the present disclosure will be described with reference to FIG. 2. FIG. 2 is a block diagram illustrating the schematic functional configuration of the information processing device 100-1 according to the first embodiment of the present disclosure.

The information processing device 100-1 includes a detection unit 102, a determination unit 104, a control unit 106, and a projection unit 108 as illustrated in FIG. 2. Note that the information processing device 100-1 is connected with the imaging device 200 through communication.

A detection unit 102 detects a pointing position. Specifically, the detection unit 102 detects a position specified through a manipulation in which a display plane is pointed to using a manipulating body at a position apart from the display plane, i.e., a pointing position as a manipulation position based on an image provided from the imaging device 200 or the like.

To be more specific, the detection unit 102 detects the pointing position based on information representing a spatial position or an attitude of the manipulating body or both of them (hereinafter also referred to as position-attitude information). The manipulating body includes, for example, an object such as a pointing rod as well as a hand or an arm of a user, and the position-attitude information of the manipulating body is acquired from a provided image or the like. For this reason, each pointing position is detected directly based on position-attitude information of a manipulating body of each detection time point, and does not depend on a pointing position detected in the past. The process of the detection unit 102 will be further described in detail with reference to FIG. 3. FIG. 3 is a diagram illustrating an example of the flow of the detection process of a pointing position of the information processing device 100-1 according to the embodiment.

First, the detection unit 102 makes a request for imaging to the imaging device 200, and acquires depth information based on an image provided from the imaging device 200 as a response to the request for imaging. For example, the detection unit 102 makes a request for imaging to the imaging device 200 through communication, and acquires respective images obtained by the imaging device 200 as a result of receiving the request for imaging and imaging a user from at least two directions. Then, after performing a process of correction, reduction, and the like on the respective acquired images, the detection unit 102 acquires depth information as illustrated in the left drawing in the upper part of FIG. 3, for example, a depth map (also referred to as a distance image) using a method such as stereo matching or the like on the respective images.

Next, the detection unit 102 acquires point group information of a three-dimensional space from the acquired depth information. For example, the detection unit 102 converts the acquired depth information such as a depth map into point group information of a three-dimensional space such as a point cloud. It should be noted that the right drawing in the upper part of FIG. 3 is a drawing illustrating the acquired point group information of the three-dimensional space.

Next, the detection unit 102 specifies a reference point for extracting a point group from the point group information of the three-dimensional space. For example, the detection unit 102 specifies a point P which is a tip toward a display region from a point group represented by the acquired point group information of the three-dimensional space as illustrated in the left drawing in the lower part of FIG. 3.

Next, the detection unit 102 extracts a point group from the specified reference point serving as a center. For example, using a segmentation process or the like, the detection unit 102 extracts a point group that is within the range of a predetermined distance R from the point P serving as a center as illustrated in the left drawing in the lower part of FIG. 3 from the point group information. The extracted point group can be, for example, a point group G of the white portion shown in the middle drawing in the lower part of FIG. 3, i.e., a part of an arm of a user.

Next, the detection unit 102 specifies a pointing position based on the extracted point group. For example, the detection unit 102 performs main component analysis on the extracted point group G to compute a vector of is first main component. Then, the detection unit 102 specifies the intersection of a direction D of the vector of the first main component as shown in the right drawing in the lower part of FIG. 3 and a display region as a pointing position.

The detection of a pointing position described above can be performed using a technique which uses a general image analysis technology or the like. In addition, the detection of a pointing position is not limited to such a technique, and a technique using information obtained from, for example, a motion sensor, or the like and other general pointing position detection technique can be used.

It should be noted that a pointing position may be a position specified based on a position pointed through a manipulation of a manipulating body. For example, when a plurality of positions pointed through manipulations of a manipulating body are presumed, a pointing position can be the center of a circle which includes the presumed positions, or the like. In addition, detection of a pointing position can be performed at a predetermined time interval.

Now, returning to FIG. 2, a determination unit 104 performs determination processes related to manipulations. Specifically, the determination unit 104 determines the start of a pause of a pointing position. Here, a pause of a pointing position includes that a pointing position does not change more than a predetermined distance for a predetermined period of time. For example, the determination unit 104 determines whether the pointing position detected by the detection unit 102 pauses in the range of the predetermined distance (hereinafter also referred to as a pause start determination range) for the predetermined period of time (hereinafter also referred to as a pause start determination time). Then, when the pointing position is determined to have paused in the pause start determination range for the pause start determination time, the determination unit 104 determines that a pause of the pointing position has started. Note that the pause start determination time can be, for example, 0.5 seconds or the like, but is not limited thereto, and an appropriate value can be set.

In addition, the determination unit 104 makes the determination of execution or non-execution of a manipulation (hereinafter also referred to as manipulation execution determination) based on the pause of the pointing position in a manipulation determination region.

For example, the determination unit 104 determines whether the pointing position detected by the detection unit 102 is in a range overlapping with the manipulation determination region. The manipulation determination region is associated with a process object, and can coincide with a display range of, for example, a graphical user interface (GUI) or the like related to activation of an application. When the pointing position is determined to be in the range overlapping with the manipulation determination region, the determination unit 104 performs the pause start determination process described above. Note that, when a manipulation object is not displayed, the determination unit 104 performs the pause start determination process even though the pointing position is not in the range overlapping with the manipulation determination region. Details thereof will be described below.

Then, when the pause of the pointing position is determined to have started, the determination unit 104 determines whether the pointing position has paused in the range overlapping with the manipulation determination region for a predetermined period of time (hereinafter also referred to as a manipulation determination time). Then, when the pointing position is determined to be in the range overlapping with the manipulation determination region for the manipulation determination time, the determination unit 104 determines that a manipulation related to the manipulation determination region, for example, selection of a display object or the like is to be executed. Note that, when the manipulation object is not displayed, the determination unit 104 does not perform the determination process with respect to the execution or non-execution of the manipulation even though the start of the pause of the pointing position is determined. Details thereof will be described below. In addition, the manipulation determination time can be, for example, 0.5 seconds or the like, like the pause start determination time, but is not limited thereto, and an appropriate value can be set.

A control unit 106 controls operations of the information processing device 100-1. Specifically, when the determination unit 104 determines the execution of a manipulation, the control unit 106 issues a command corresponding to the manipulation. For example, when the pointing position pauses at a predetermined position, for example, in the manipulation determination region and the determination unit 104 determines the execution of a manipulation, the control unit 106 issues a command associated with the manipulation, for example, a display object selection execution command. It should be noted that the command issued by the control unit 106 is provided to a process execution unit separately provided in the information processing device 100-1, and a process to be executed based on the command provided by the process execution unit.

In addition, the control unit 106 controls display of a display region. Specifically, the control unit 106 changes the display of the display object related to the pointing position according to an elapsed time of the pause of the pointing position before the manipulation execution determination by the determination unit 104. Details of the process of the control unit 106 will be described with reference to FIG. 4. FIG. 4 is a diagram illustrating an example of a display change in a display region according to the process of the information processing device 100-1 according to the embodiment.

First, the control unit 106 causes a projection unit 108 to project display content. For example, the control unit 106 causes the projection unit 108 to project a display which includes a plurality of manipulation determination regions 40 toward a display region 1 as illustrated in the left drawing in the upper part of FIG. 4. Note that the manipulation determination regions 40 can coincide with, for example, display ranges of activation icons of applications or the like.

Next, when a start of a pause of a pointing position is determined, the control unit 106 causes a manipulation object to be newly displayed at the pointing position. For example, when a user performs a pointing manipulation toward the display region as illustrated in the middle drawing in the upper part of FIG. 4, the determination unit 104 makes determination on the start of the pause of the pointing position. When the start of the pause of the pointing position is determined, the control unit 106 causes a cursor 30 to be displayed at the pointing position. Further, the control unit 106 performs a displaying operation to show the user that the manipulation object is newly displayed. Initial display of the manipulation object will be described in detail with reference to FIG. 5. FIG. 5 is a diagram illustrating an example of the initial display of the manipulation object in the process of the information processing device 100-1 according to the embodiment.

Initial Display of the Manipulation Object

First, when the start of the pause of the pointing position is determined, the control unit 106 causes the manipulation object to be displayed at the pointing position, and performs the displaying operation based on the display position of the manipulation object. For example, when the start of the pause of the pointing position is determined by the determination unit 104, the control unit 106 causes the cursor 30 to be displayed in the display region 1, and causes an initial light emitting circle 12 to be displayed with the cursor 30 as its center.

Next, the control unit 106 causes the display based on the display position of the manipulation object to change toward the display position of the manipulation object. For example, the control unit 106 causes the radius of the initial light emitting circle 12 to decrease according to an elapsed time of the display of the initial light emitting circle 12 to cause the initial light emitting circle 12 to approach the cursor 30.

Then, the control unit 106 erases the display based on the display position of the manipulation object. For example, when the initial light emitting circle 12 approaches a position that overlaps with the cursor 30, the control unit 106 erases the initial light emitting circle 12 from the display region 1.

Now, returning to FIG. 4, when the pointing position is moved, the control unit 106 causes the manipulation object to move according to the movement of the pointing position. For example, whets the user moves a position that he or she has pointed to as illustrated in the right drawing in the upper part of FIG. 4, the pointing position detected by the detection unit 102 is changed, and thus the control unit 106 changes the position of the cursor 30 according to the change of the pointing position.

Next, when the start of the pause of the pointing position in the manipulation determination region is determined, the control unit 106 causes the display of the display object related to the pointing position to change according to the elapsed time from the pause start determination until the execution or non-execution of a manipulation is determined. For example, when the determination unit 104 determines the start of the pause of the pointing position in the manipulation determination region, the control unit 106 causes the display of the manipulation object indicating the pointing position to be changed so as to indicate the remaining time until the determination of the execution or non-execution of the manipulation. The display change of the manipulation object will be further described in detail with reference to FIG. 6. FIG. 6 is a diagram illustrating an example of the display change of the manipulation object according to the process of the information processing device 100-1 according to the present embodiment.

Display Change of a Manipulation Object

First, the control unit 106 causes the manipulation object to be displayed based on the pointing position. For example, as the manipulation object, the control unit 106 causes the cursor 30 which is provided with light emitting particles 14 and a light emitting circle 16 to be displayed as illustrated in the left drawing of FIG. 6.

The light emitting particles 14 can be displayed at a plurality of positions detected as candidates for the pointing position when the pointing position is detected by the detection unit 102. Note that the pointing position can be a position obtained through filtering using a predetermined filter with respect to the plurality of candidate positions.

The light emitting circle 16 can be a circle containing the light emitting particles 14 and having the pointing position as its center. Note that the light emitting circle 16 may not contain all of the light emitting particles 14. In addition, the light emitting circle 16 may not be displayed in a predetermined case of display of the light emitting particles 14. For example, when the pointing position is moved at a speed equal to or higher than a threshold value, the control unit 106 causes the light emitting particles 14 to move so as to trace movements of the pointing position and stops display of the light emitting circle 16. In addition, when the speed of the movement of the pointing position is lower than the threshold value, the control unit 106 causes the light emitting circle 16 to be displayed again. In this case, by performing filtering or the like during acquisition of the pointing position, the display position of the light emitting circle 16 and the display position of the light emitting particles 14 can be suppressed from being apart from each other when the pointing position is moved, and the pointing position can be prevented from being misrecognized by the user.

It should be noted that the inner side of the light emitting circle 16, for example, a range from the center to a predetermined distance thereof may emit light less intensely than the light emitting particles 14 as illustrated in each drawing of FIG. 6. In this case, the user can receive an impression of the light emitting particles 14 as being one mass, and even when the light emitting circle 16 is not displayed, the user can easily recognize the pointing position.

In addition, when the start of the pause of the pointing position is determined, the control unit 106 starts a change in the display of the manipulation object. For example, when the determination unit 104 determines the start of the pause, the control unit 106 causes an outer light emitting circle 18 to be displayed on the outer side of the light emitting circle 16 of the cursor 30 as illustrated in the left-middle drawing of FIG. 6.

Next, the control unit 106 causes the display of the manipulation object to change according to an elapsed time of the pause so as to indicate the remaining time until determination of the execution or non-execution of a manipulation. For example, the control unit 106 can cause the radius of the outer light emitting circle 18 to decrease according to the elapsed time from the start of the pause to cause the outer light emitting circle 18 to approach the light emitting circle 16 as illustrated in the right-middle drawing and right drawing of FIG. 6. In addition, the control unit 106 causes the display to change such that the outer light emitting circle 18 approaches the light emitting circle 16 at a speed at which the light emitting circle 16 coincides with the outer light emitting circle 18 at the time point at which the manipulation determination time elapses. Note that the outer light emitting circle 18 disappears when the manipulation determination time elapses.

Further, the control unit 106 may cause the radius of the outer light emitting circle 18 to decrease and brightness of the outer light emitting circle 18 to increase as illustrated in the left-middle drawing to the right drawing of FIG. 6. In this case, as the decrease of the remaining time until the execution of the manipulation is determined is emphasized, it is possible to prompt determination of whether the user is to be caused to execute the manipulation.

Now, returning to FIG. 4, when the execution of the manipulation is determined, the control unit 106 next issues a command corresponding to the manipulation related to the manipulation determination region. For example, when the determination unit 104 determines the execution of the manipulation, the control unit 106 issues a command of selection execution of an activation icon of an application displayed in the manipulation determination region. Then, based on the command, selection of the activation icon of the application displayed in the manipulation determination region is executed as illustrated in, for example, the middle drawing in the lower part of FIG. 4.

Note that, when the pointing position is not detected, the control unit 106 erases the display of the manipulation object. For example, when a predetermined time elapses after the detection unit 102 does not detect the pointing position, the control unit 106 erases display of the cursor 30 from the display region 1.

Here, returning to FIG. 2, the projection unit 108 projects display content based on an instruction of the control unit 106. To be specific, the projection unit 108 projects an image, a video, or the like generated by the control unit 106 in a projection direction. For example, the projection unit 108 can be a cathode ray tube (CRT), a projector which uses liquid crystal, or the like. Note that the projection unit 108 may be a display unit such as a display which uses liquid crystal or organic electro-luminescence (EL).

In addition, the imaging device 200 performs imaging according to a request from the information processing device 100-1. To be specific, when an imaging request is received from the detection unit 102, the imaging device 200 performs imaging according to the imaging request, and provides an image obtained from the imaging to the information processing device 100-1. For example, the imaging device 200 has two or more imaging units and performs imaging using the respective imaging units. Note that the number of installed imaging devices 200 may be plural, and the respective imaging devices 200 can be connected to the information processing device 100-1. In addition, an installation place of the imaging device 200 is not limited to the lower side of the display region 1 as illustrated in FIG. 1, and the imaging device 200 can be installed at any position at which a user who performs manipulations toward the display region 1 can be captured as a subject.

2-2. Process of the Information Processing Device

Next, the process of the information processing device 100-1 according to the present embodiment will be described with reference to FIG. 7. FIG. 7 is a flow chart conceptually showing the process of the information processing device 100-1 according to the present embodiment.

First, the information processing device 100-1 determines whether a pause of the pointing position has started (Step S302). Specifically, when the detection unit 102 detects the pointing position, the determination unit 104 determines whether the pointing position has paused in the pause start determination range from the detection of the pointing position until the pause start determination time elapses. It should be noted that since the manipulation object is not displayed, the determination unit 104 performs pause start determination even though the pointing position is not in the manipulation determination region.

When the start of the pointing position is determined to have started, the information processing device 100-1 performs initial displaying of the manipulation object (Step S304). Specifically, when the determination unit 104 determines the start of the pause of the pointing position, the control unit 106 causes the manipulation object to be displayed at the pointing position, and performs an initial displaying process based on the display position of the manipulation object.

Next, the information processing device 100-1 determines whether the pointing position has been undetected for a predetermined period of time (Step S306). Specifically, the control unit 106 determines whether the predetermined period of time has elapsed since the detection unit 102 has not detected the pointing position.

When the pointing position is detected, the information processing device 100-1 determines whether a pause of the pointing position has started in the manipulation determination region (Step S308). Specifically, when the pointing position is in the manipulation determination region, substantially the same process as the pause start determination process of Step S302 is performed.

When the pause of the pointing position is determined to have started, the information processing device 100-1 changes the display of the manipulation object (Step S310). Specifically, the control unit 106 changes the display of the manipulation object so as to indicate the remaining time until the manipulation determination time elapses for each predetermined period of elapsed time.

Next, the information processing device 100-1 determines whether the pause of the pointing position has been halted (Step S312). Specifically, the determination unit 104 determines whether the pointing position has been moved to an outside of the manipulation determination region.

When the pause of the pointing position is determined not to have been halted, the information processing device 100-1 determines whether the manipulation determination time has elapsed (Step S314). Specifically, when the pointing position is determined not to have been moved to an outside of the manipulation determination region, the determination unit 104 determines whether the manipulation determination time has elapsed from the determination of the start of the pause.

When the manipulation determination time is determined to have elapsed, the information processing device 100-1 executes a manipulation related to the manipulation determination region (Step S316). When the determination unit 104 determines that the manipulation determination time has elapsed, the control unit 106 issues a command corresponding to the manipulation related to the manipulation determination region. Then, a process based on the issued command, for example, a selection process of a display object displayed in the manipulation determination region is executed.

As described above, according to the first embodiment of the present disclosure, the information processing device 100-1 performs determination of the execution or non-execution of a manipulation based on a pause of a pointing position specified through a manipulation in which a display plane is pointed to using a manipulating body at a position apart from the display plane, and when the execution of the manipulation is determined, issues a command corresponding to the manipulation. For this reason, as an additional manipulation is realized due to the pause of the pointing position related to the manipulation of the manipulating body at the position apart from the display plane, the information processing device 100-1 can execute the additional manipulation according to an intention of a user, and user convenience with respect to pointing manipulations can be improved.

In addition, the control unit 106 changes the display of a display object related to the pointing position according to an elapsed time of the pause before the determination. For this reason, as the display of the display object gradually changes after the start of the pause, the user can know the pause state, and thus the user can be prompted to perform a manipulation of maintaining or cancelling the pause state or the like so as to bring about a result that the user intends.

In addition, the above-described display object includes a manipulation object which indicates a pointing position, and the control unit 106 changes the display of the manipulation object according to an elapsed time of a pause thereof. For this reason, as the display of the manipulation object that is closely related to a pointing manipulation of the user is changed, it is possible to let the user know that the pointing position is in a pause state, and to suppress the manipulation execution determination that does not match his or her intention.

In addition, the control unit 106 changes the display of the manipulation object so as to indicate the remaining time until the determination. For this reason, as a grace period with respect to a pause cancellation manipulation of the pointing position is indicated to the user, it is possible to prompt the user to perform the manipulation, and further lower a possibility of the manipulation execution determination which does not match his or her intention being performed.

2-3. Modified Example

The first embodiment of the present disclosure has been described above. Note that the present embodiment is not limited to the above-described example. Hereinbelow, first to third modified examples of the present embodiment will be described.

First Modified Example

As a first modified example of the embodiment, the information processing device 100-1 may change the display of a process object which indicates a process to be executed during a pause of a pointing position according to an elapsed time of the pause. Specifically, the control unit 106 changes the display of the process object specified based on the pointing position according to the elapsed time of the pause.

For example, when the determination unit 104 determines that a pause of the pointing position has started, the control unit 106 changes the display of a process object, for example, an activation icon or the like of an application according to the elapsed time from the start of the pause of the pointing position. For example, a display change of a process object can be a change in the size, color, shape, or pattern of the process object.

As described above, according to the first modified example of the embodiment, the control unit 106 changes the display of the process object specified based on the pointing position according to the elapsed time of the pause. For this reason, as the display of the process object which can be a target of a manipulation whose execution or non-execution is determined based on the pause of the pointing position is changed, it is possible to lower a possibility of the user making a mistake in determining whether the pause of the pointing position is to be halted.

Second Modified Example

As a second modified example of the embodiment, the information processing device 100-1 may perform various types of display controls using the manipulation execution determination based on a pause of a pointing position. Specifically, the information processing device 100-1 performs a process of displaying a process menu, scrolling manipulation, or the like using the determination process.

Display of a Process Menu

When the execution of a manipulation is determined based on a pause of a pointing position, the information processing device 100-1 may cause a process menu formed on the basis of the priorities of processes to be displayed. Specifically, the control unit 106 causes a menu which includes process objects to be displayed, and preferentially arranges the process objects related to processes having higher priorities than other processes over other process objects on the menu. Note that, in the present modified example, an example in which a manipulation determination region coincides with a display range of a process object will be described. First, a problem of a menu displayed by an information processing device of the related art will be described with reference to FIG. 8A. FIG. 8A is a diagram for describing a menu manipulation displayed by the information processing device of the related art.

A process menu displayed based on a pointing position generally includes a plurality of rectangular process objects arranged with the pointing position at their center. For example, rectangular process objects M1 to M4 are arranged on the upper, lower, right, and left sides of the cursor 30 which indicates the pointing position as their center as illustrated in FIG. 8A.

Here, there are cases in which the selection frequencies of the process objects on the process menu are different between the process objects. For example, the number of selections of the process objects related to the process of "decide" or "return" is high in comparison to other processes. However, the respective process objects are generally arranged at an equal distance from the pointing position that is the starting point of a menu selection manipulation and to have the same size. For this reason, a manipulation time related to the selection of a process object and trouble resulting from occurrence of an erroneous selection are not dependent on a selection frequency and thus there is no difference between the process objects, and improvement in a selection manipulation of a process object having a high selection frequency has been demanded.

Thus, the information processing device 100-1 according to the second modified example of the embodiment preferentially arranges process objects related to processes having higher priorities than other processes (hereinafter also referred to as first process objects) over other process objects (hereinafter also referred to as second process objects). Specifically, the control unit 106 arranges the first process objects that are larger at a position closer to the center of the menu than the second process objects. The process of the present modified example will be further described in detail with reference to FIG. 8B. FIG. 8B is a diagram illustrating an example of display of a process menu in a process of an information processing device 100-1 according to the second modified example of the embodiment.

First, when the execution of a manipulation is determined based on a pause of a pointing position, the control unit 106 causes a process menu which includes process objects to be displayed with the pointing position as their center. For example, when the determination unit 104 determines the execution of a manipulation based on a pause of the pointing position, the control unit 106 causes the process objects M1 to M5 included in the process menu to be displayed in parts on a concentric circle which has the cursor 30 indicating the pointing position as its center as illustrated in FIG. 8B.

Further, the process objects included in the process menu are displayed at positions that are based on the priorities of the processes. For example, the control unit 106 causes the first process objects M1 and M2 to be displayed at positions that are at a distance R1 from the cursor 30 at the pointing position, and the second process objects M3 to M5 to be displayed at positions that are at a distance R2 and R3 from the cursor 30 farther than the distance R1.

In addition, the process objects are displayed with sizes based on the priorities of the processes. For example, the control unit 106 causes the size of the first process objects M1 and M2 to be displayed in a larger display range than the second process objects M3 to M5.

In addition, the selection of a process object included in the process menu is not limited to the execution thereof caused by the manipulation execution determination based on a pause, and can be executed based on a contact of the manipulation object with the process object, the passage of the manipulation object over the process object, a movement distance of the manipulation object within the process object, or the like.

As described above, the control unit 106 causes the menu which includes the process objects to be displayed. In addition, the control unit 106 preferentially arranges first manipulation determination regions of the process objects related to the processes having higher priorities than other processes over second manipulation determination regions of the other process objects. For this reason, as a process object related to a process having a high priority is easily selected, the manipulation performance of the menu can be improved.

In addition, the control unit 106 arranges the first manipulation determination regions at the positions closer to the center of the menu than the second manipulation determination regions, and sets the first manipulation determination regions to be larger than the second manipulation determination regions. For this reason, a movement distance of the pointing position to a process object related to a process having a high priority is shorter than to another process object, a possibility of a user mistakenly selecting another process object in performing a process object selection manipulation is lowered, and thereby the manipulation performance can be further improved.

Note that the control unit 106 may execute only one of setting of the first manipulation determination regions to be larger than the second manipulation determination regions and arranging the first manipulation determination regions at the positions closer to the center of the menu than the second manipulation determination regions.

Scrolling Manipulation

In addition, the information processing device 100-1 may scroll the display of a display region using the determination of execution of a manipulation based on a pause of a pointing position. Specifically, when the execution of the manipulation is determined based on the pause of the pointing position in a manipulation determination region related to scrolling, the control unit 106 causes the display of the display region to be scrolled according to a change of the pointing position. The scrolling process of the present modified example will be described in detail with reference to FIG. 9. FIG. 9 is a diagram illustrating an example of a display change according to the scrolling process of the information processing device 100-1 according to the second modified example of the embodiment.

First, the control unit 106 causes a display object related to a scrolling manipulation to be displayed in the display region. For example, the control unit 106 causes a scroll bar including a thumb 50 and a track 52 as illustrated in the left drawing in the upper part of FIG. 9 to be displayed in the display region 1. Note that initial display of the scroll bar can be displayed blurred compared to other displays in the display region, for example, to be thin or dark.

Next, when the pointing position is moved to be in a range of a predetermined distance from a display object related to a scrolling manipulation, the control unit 106 changes the display of the display object related to the scrolling manipulation. For example, when the cursor 30 indicating the pointing position is moved to be in the range of the predetermined distance from the scroll bar, the control unit 106 causes display of the scroll bar to be clearly displayed, for example, changes it into a thick or bright display as illustrated in the middle drawing and the right drawing in the upper part of FIG. 9.

Next, when the execution of a manipulation based on a pause of the pointing position is determined at a position at which the pointing position overlaps with the manipulation object related to the scrolling manipulation, the control unit 106 transitions the state of the manipulation object related to the scrolling manipulation to a movable state. For example, when the execution of the manipulation is determined at a position at which the cursor 30 overlaps with the thumb 50, the control unit 106 transitions the state of the thumb 50 to a movable state.

Next, the control unit 106 causes the display of the display region to scroll according to a movement of the manipulation object related to the scrolling manipulation. For example, when the state of the thumb 50 is transitioned to the movable state and the cursor 30 is moved along the track 52, the control unit 106 moves the thumb 50 according to the movement of the cursor 30 as illustrated in the left drawing and the middle drawing in the lower part of FIG. 9. Then, the control unit 106 scrolls the display of content C1 to C6 displayed in the display region to the display of C5 to C10 according to the movement of the thumb 50. Note that the thumb 50 is displayed initially at the center of the track 52, and the control unit 106 may quickly scroll as the thumb 50 is farther from the initial display position.

In addition, when the pointing position is moved to be out of the range of the predetermined distance from the display object related to the scrolling manipulation, the control unit 106 returns the display of the display object related to the scrolling manipulation to its initial state. For example, when the cursor 30 is moved to be out of the range of the predetermined distance from the scroll bar as illustrated in the right drawing in the lower part of FIG. 9, the control unit 106 returns the display of the scroll bar to the initial display.

As described above, when the execution of a manipulation based on a pause of the pointing position is determined in the manipulation determination region related to scrolling, the control unit 106 scrolls the display of the display region according to a change of the pointing position. For this reason, as the scrolling manipulation caused by the pointing manipulation is possible, convenience can be improved.

Third Modified Example

As a third modified example, when a hand of a user who performs a pointing manipulation is open toward the display region, the information processing device 100-1 may perform a detection process so that an intended pointing position of the user is detected. First, a problem of detection of a pointing position in an information processing device of the related art when a hand of a user is open toward a display region will be described with reference to FIG. 10. FIG. 10 is a diagram for describing the detection process of the pointing position when a hand of a user is opened toward the display region with respect to the information processing device of the related art. Note that description of substantially the same process as the pointing position detection process of the first embodiment will be omitted.

First, the information processing device of the related art acquires depth information based on an image in which a user who opens his or her hand toward the display region is a subject, and acquires point group information of a three-dimensional space from the acquired depth information. For example, the point group information of the three-dimensional space as illustrated in the drawing of the upper part of FIG. 10 is acquired.

Next, the information processing device of the related art specifies a reference point for extracting a point group from the point group information of the three-dimensional space. For example, a point P which is a tip toward the display region is specified as illustrated in the left drawing in the lower part of FIG. 10.

Next, the information processing device of the related art extracts a point group with the specified reference point as a center. For example, a point group G1 that is in the range of a predetermined distance R from the point P illustrated in the left drawing in the lower part of FIG. 10 is extracted from the point group information.

The extracted point group (31 can be a point group of the white portion illustrated in, for example, the middle drawing in the lower part of FIG. 10.

Next, the information processing device of the related art specifies a pointing position based on the extracted point group. For example, a direction D1 illustrated in the right drawing in the lower part of FIG. 10 is computed based on the extracted point group G1, and an intersection of the computed direction D1 and the display region is specified as a pointing position.

Here, the computed direction D1 is a direction parallel with a plane that the palm of the hand forms, which may be different from an intended direction of the user. For this reason, a pointing position intended by the user is not detected, and thus the manipulation performance may degrade. Thus, in the third modified example of the present embodiment, two techniques for detecting an intended pointing position of the user are proposed.

Detection of a Perpendicular Line Direction of the Palm

As the first technique, the information processing device 100-1 detects a perpendicular line direction of a palm of the user, and detects a pointing position based on the detected direction. Specifically, when the palm of the user is open toward the display region, the detection unit 102 detects the direction of a perpendicular line to the plane formed by the palm which is the direction of the perpendicular line toward the display region as a direction pointed through a manipulation of a manipulating body (hereinafter also referred to as a pointing direction). Then, the detection unit 102 detects a pointing position based on the pointing direction. The process of the first technique will be further described in detail with reference to FIG. 11. FIG. 11 is a diagram for describing an example of the detection process of a pointing position when a hand of a user is opened toward a display region with respect to the information processing device 100-1 according to the third modified example of the embodiment. Note that description of substantially the same process as that of the first embodiment will be omitted.

First, the detection unit 102 acquires depth information based on an image in which a user who opens his or her hand toward the display region is a subject, and acquires point group information of the three-dimensional space from the acquired depth information. For example, the point group information of the third-dimensional space as illustrated in the left drawing of FIG. 11 is acquired.

Next, the detection unit 102 extracts a point group which corresponds to the palm of the user from point groups indicated by the acquired point group information. For example, the detection unit 102 detects the palm of the user through analysis of the image used in the acquisition of the depth information or the like. Then, the detection unit 102 extracts the point group which corresponds to the position of the detected palm from the point groups indicated by the acquired point group information as illustrated in the middle drawing of FIG. 11.

Next, the detection unit 102 specifies the perpendicular direction to the plane formed by the extracted point group, and specifies a pointing position based on the specified direction. For example, the detection unit 102 specifies the plane formed by the extracted point group (hereinafter also referred to as the plane related to the palm), and then detects a direction D2 that is the direction perpendicularly intersecting the specified plane toward the display region 1 as illustrated in the right drawing of FIG. 11. Then, the detection unit 102 specifies the intersection of the direction D2 and the display region as the pointing position. Note that, as the intersection of the plane related to the palm and the direction D2, various points can be employed. For example, the intersection can be the center point of the plane related to the palm.

As described above, according to the first technique of the third modified example of the embodiment, when a palm of the user is open toward the display region, the detection unit 102 detects the direction of a perpendicular line to the plane formed by the palm which is the direction of the perpendicular line toward the display region as the pointing direction. For this reason, the pointing position detected in the state in which the palm of the user related to the pointing manipulation is open approaches the intended position of the user, and thus degradation in the manipulation performance can be suppressed.

Detection of the Direction of an Arm

As the second technique, the information processing device 100-1 detects the direction of an arm of the user, and detects the pointing position based on the detected direction. Specifically, the detection unit 102 extracts an arm of the user related to a pointing manipulation of the user, and detects the direction that is indicated by the extracted arm of the user toward the display region as the pointing direction. Then, the detection unit 102 detects the pointing position based on the pointing direction. The process of the second technique will be further described in detail with reference to FIG. 12. FIG. 12 is a diagram for describing another example of the detection process of the pointing position when a hand of the user is opened toward the display region with respect to the information processing device 100-1 according to the third modified example of the embodiment. Note that description of substantially the same process as that of the first embodiment will be omitted.

First, the detection unit 102 acquires depth information based on an image in which the user who opens his or her hand toward the display region is a subject, and acquires point group information of a three-dimensional space from the acquired depth information. For example, the point group information of the three-dimensional space as illustrated in the left drawing in the upper part of FIG. 12 is acquired.

Next, the detection unit 102 specifies a reference point for extraction of a point group from the point group information of the three-dimensional space, and extracts the point group with the specified reference point as the center. For example, the detection unit 102 specifies a point P illustrated in the middle drawing in the upper part of FIG. 12 as the reference point from the acquired point group information, and then extracts a point group G1 that is within the range of a predetermined distance R from the center of the specified point P. The extracted point group G1 can be, for example, a point group of the white portion illustrated in the right drawing in the upper part of FIG. 12, i.e., a part of a hand and an arm of the user.

Next, the detection unit 102 eliminates a part of the extracted point group close to the display region. For example, the detection unit 102 eliminates a point group that is within the range of a predetermined distance from a point serving as a tip in the direction toward the display region from the extracted point group. Note that the point group obtained from the above process can be a point group G2 illustrated in the middle drawing in the lower part of FIG. 12. In addition, the predetermined distance can be, for example, 10 cm or the like.

Next, the detection unit 102 specifies the pointing position based on the extracted point group. For example, the detection unit 102 performs main component analysis with respect to the extracted point group G2, thereby computing a vector of a first main component. Then, the detection unit 102 specifies the intersection of a direction D3 of the vector of the first main component and the display region as the pointing position as illustrated in the right drawing in the lower part of FIG. 12.

As described above, according to the second technique of the third modified example of the embodiment, the detection unit 102 extracts an arm of the user related to a pointing manipulation of the user, and detects the direction that is indicated by the extracted arm of the user toward the display region as the pointing direction. For this reason, as the intended pointing direction of the user can be detected regardless of a state of his or her palm, a change in the manipulation performance depending on the shape of the palm can be suppressed.

3. Second Embodiment (Example in Which a Manipulation Determination Time is Changed)

The information processing device 100-1 according to the first embodiment of the present disclosure has been described above. Next, an information processing device 100-2 according to a second embodiment of the present disclosure will be described. The information processing device 100-2 changes a manipulation determination time based on a pointing position in a manipulation determination region.

3-1. Configuration of an Information Processing Device

A functional configuration of the information processing device 100-2 is substantially the same as the functional configuration according to the first embodiment, but the function of the determination unit 104 is partly different. Note that description of substantially the same functions as that in the first embodiment will be omitted.

The determination unit 104 controls a time from a start of a pause of the pointing position to the determination of execution or non-execution of a manipulation, i.e., a manipulation determination time based on the pointing position in a manipulation determination region. Specifically, the determination unit 104 controls the manipulation determination time based on a positional relation between the pointing position and a process object related to the manipulation determination region. The process of the determination unit 104 will be further described in detail with reference to FIG. 13. FIG. 13 is a diagram for describing a change in a manipulation determination time according to the process of the information processing device 100-2 according to the present embodiment.

First, the control unit 106 causes a manipulation object and a process object to be displayed in the display region. For example, the control unit 106 causes the cursor 30 and icons 20A to 20C to be displayed in the display region 1 as illustrated in the left drawing of FIG. 13. Note that the manipulation determination regions of the icons 20A to 20C can be 40A to 40C respectively.

Then, when the start of a pause of the pointing position is determined, the determination unit 104 determines overlapping or non-overlapping of the pointing position and the process object. For example, when the cursor 30 pauses in the manipulation determination region 40A as illustrated in the middle drawing of FIG. 13, the determination unit 104 determines that the pause of the pointing position indicated by the cursor 30 has started. Then, the determination unit 104 determines overlapping or non-overlapping of the cursor 30 and the icon 20A displayed in the manipulation determination region 40A.

When the pointing position is determined to be overlapping with the process object, the determination unit 104 sets the manipulation determination time to a first time. For example, when the cursor 30 is determined to be overlapping with the icon 20A, the determination unit 104 can set the manipulation determination time to the first time, for example, 0.5 seconds.

Then, when the pointing position is moved to a position on the manipulation determination region at which it does not overlap with the process object, the determination unit 104 changes the manipulation determination time to a second time. For example, when the cursor 30 is moved to a position on the manipulation determination region 40A at which it does not overlap with the icon 20A, the determination unit 104 changes the manipulation determination time to the second time that is longer than the first time. For example, the determination unit 104 can change the manipulation determination time from 0.5 seconds to 1.0 second.

3-2. Process of the Information Processing Device

Next, the process of the information processing device 100-2 of the present embodiment will be described with reference to FIG. 14. FIG. 14 is a flow chart conceptually showing the process of the information processing device 100-2 of the present embodiment. Note that description of substantially the same process as that of the first embodiment will be omitted.

First, the information processing device 100-2 determines whether the pointing position has been undetected for a predetermined period of time (Step S402), and when the pointing position is detected, determines whether a pause of the pointing position in the manipulation determination region has started (Step S404). When the pause of the pointing position is determined to have started, the display of the manipulation object is changed (Step S406).

Next, the information processing device 100-2 determines whether the pointing position has been Moved onto the process object (Step S408). Specifically, the determination unit 104 determines the overlapping or non-overlapping of the pointing position and the process object, and compares this determination with past overlapping or non-overlapping of pointing position and the process object. Note that the process of this step may be performed only when the pointing position has been changed.

When the pointing position is determined to have been moved onto the process object, the information processing device 100-2 sets the manipulation determination time to the first time (Step S410). Specifically, when the pointing position is determined to have been moved to a position at which it overlaps with the process object, the determination unit 104 sets the manipulation determination time to the first time. Note that the determination unit 104 may not perform the process of this step when the initial value is the first time.

In addition, when the pointing position is determined not to have been changed on the process object, the information processing device 100-2 determines whether the pointing position has been moved to an outside of the process object (Step S412). Specifically, when the pointing position is determined not to have been changed to a position at which it overlaps with the process object, the determination unit 104 determines whether the pointing position has been moved to a position at which it overlaps with the manipulation determination region and does not overlap with the process object.

When the pointing position is determined to have been moved to an outside of the process object, the information processing device 100-2 sets the manipulation determination time to the second time (Step S414). Specifically, when the pointing position is determined to have been moved to a position at which it does not overlap with the process object, the determination unit 104 sets the manipulation determination time to the second time. Note that the determination unit 104 may not perform the process of this step when the initial value is the second time.

Next, the information processing device 100-2 determines whether the pause of the pointing position has been halted (Step S416), and when the pause of the pointing position is determined not to have been halted, the information processing device determines whether the manipulation determination time has elapsed (Step S418). When the manipulation determination time is determined to have elapsed, the information processing device 100-2 performs a manipulation related to the manipulation determination region (Step S420).

As described above, according to the second embodiment of the present disclosure, the information processing device 100-2 controls the manipulation determination time that is from the start of the pause of the pointing position to the determination of execution or non-execution of the manipulation based on the pointing position in the manipulation determination region associated with the process object. For this reason, as the manipulation determination time can be changed according to states of a pointing manipulation, a manipulation result that the user intends can be easily obtained, and thus the manipulation performance can be improved.

In addition, the determination unit 104 controls the manipulation determination time based on the positional relation between the pointing position and the process object related to the manipulation determination region. For this reason, as the manipulation determination time that reflects an intention of the user presumed from the positional relation is set, the manipulation performance can be further improved.

Note that, although the example in which the determination unit 104 changes the manipulation determination time according to the overlapping or non-overlapping of the pointing position and the process object has been described above, the determination unit 104 may change the manipulation determination time according to the distance between the pointing position and the process object. For example, after the start of the pause of the pointing position is determined, the determination unit 104 computes the distance between the pointing position and the process object at a predetermined time interval, and thereby can set the manipulation determination time to be longer if the computed distance becomes longer. In this case, as the setting of the manipulation determination time is finely changed, it is possible to avoid giving a feeling of discomfort caused by the change of the manipulation determination time to the user.

3-3. Modified Examples

The second embodiment of the present disclosure has been described above. Note that the embodiment is not limited to the above-described example. Hereinafter, first to fifth modified examples of the embodiment will be described.

First Modified Example

As the first modified example of the embodiment, the information processing device 100-2 may distinguish a region in which a plurality of manipulation determination regions overlap with each other from other regions in a setting of the manipulation determination time. Specifically, the determination unit 104 controls the manipulation determination time according to the overlapping or non-overlapping of the region in which the plurality of manipulation determination regions overlap with each other and a pointing position. The process of the present modified example will be further described in detail with reference to FIG. 15. FIG. 15 is a diagram illustrating an example of the setting of the manipulation determination region in the process of the information processing device 100-2 according to the first modified example of the embodiment.

First, the plurality of manipulation determination regions are set to overlap with each other. For example, the manipulation determination regions 40A to 40C related to the icons 20A to 20C can be arranged to overlap with each other as illustrated in FIG. 15.

Then, after the start of a pause of the pointing position is determined, the determination unit 104 determines at a predetermined time interval whether the pointing position has been moved to an overlapping region of the manipulation determination regions. For example, after the start of a pause of the pointing position indicated by the cursor 30 in the manipulation determination region 40A is determined, the determination unit 104 determines at the predetermined time interval whether the position of the cursor 30 has been moved to the region in which the manipulation determination regions 40A and 40B overlap and the region in which the manipulation determination regions 40A and 40C overlap.

When the pointing position is determined to have been moved to the overlapping region of the manipulation determination regions, the determination unit 104 changes the manipulation determination time. For example, when the cursor 30 has been moved to the region in which the manipulation determination regions 40A and 40C overlap, the determination unit 104 sets the manipulation determination time to be longer when the pointing position is positioned only in the manipulation determination region 40A. For example, the determination unit 104 can change the manipulation determination time from 1.0 second to 1.2 seconds.

As described above, according to the first modified example of the embodiment, the determination unit 104 controls the manipulation determination time according to the overlapping or non-overlapping of the region in which the plurality of manipulation determination regions overlap with each other and the pointing position. For this reason, for a position of a manipulation determination region having a higher possibility that the user does not desire execution of a manipulation during manipulation determination than any other position, a longer manipulation determination time can be set than that of the other position, and thus degradation in manipulation performance can be suppressed.

Second Modified Example

As the second modified example of the present embodiment, the information processing device 100-2 may distinguish a manipulation determination region outside a display region from other regions in a setting of a manipulation determination time. Specifically, the determination unit 104 controls the manipulation determination time according to the overlapping or non-overlapping of the manipulation determination region outside the display region and the pointing position. The process of the present modified example will be further described in detail with reference to FIG. 16. FIG. 16 is a diagram illustrating another example of the setting of the manipulation determination regions in the process of the information processing device 100-2 according to the second modified example of the embodiment.

First, the manipulation determination regions are set over the inside and the outside of the display region. For example, each of the manipulation determination regions 40A to 40C can be set over the inner side and the outer side of the display region 1 as illustrated in FIG. 16. Note that the manipulation determination regions may only be set outside of the display region.

Then, after the start of the pause of the pointing position is determined, the determination unit 104 determines at a predetermined time interval whether the pointing position has been moved to a manipulation determination region outside the display region. For example, after the start of the pause of the pointing position 10 indicated by the cursor 30 in the manipulation determination region 40A is determined, the determination unit 104 determines at a predetermined time interval whether the pointing position 10 has been moved to the manipulation determination region 40A outside the display region 1.

When the pointing position is determined to have been moved to the manipulation determination region outside the display region, the determination unit 104 changes the manipulation determination time. For example, when the pointing position 10 is determined to have been moved to the manipulation determination region 40A outside the display region 1 as illustrated in FIG. 16, the determination unit 104 sets the manipulation determination time to be shorter than when the pointing position 10 is positioned in the manipulation determination region 40A inside the display region 1. For example, the determination unit 104 can change the manipulation determination time from 1.0 second to 0.8 seconds.

As described above, according to the second modified example of the embodiment, the determination unit 104 controls the manipulation determination time according to the overlapping or non-overlapping of the manipulation determination region outside the display region and the pointing position. For this reason, accuracy in manipulation execution determination is improved as the manipulation determination region outside the display region which can bring higher accuracy in determining a region where the pointing position is than that inside the display region is used, the manipulation performance can be improved.

Third Modified Example

As the third modified example of the embodiment, the information processing device 100-2 may control the manipulation determination time based on information other than the pointing position of the manipulation determination region. To be specific, the determination unit 104 controls the manipulation determination time based on accuracy factor information which changes accuracy of the pointing position. To be more specific, the determination unit 104 controls the manipulation determination time based on information which represents a state of a user (hereinafter also referred to as user state information). The process of the present modified example will be further described in detail with reference to FIG. 17. FIG. 17 includes diagrams illustrating examples of forms of pointing manipulations in the process of the information processing device 100-2 according to the third modified example of the embodiment.

Control of a manipulation determination time based on a state of a user First, when the start of a pause of the pointing position is determined, the determination unit 104 acquires the user state information. For example, the user state information includes information which represents the form of a motion of a user who points to a position (hereinafter also referred to as gesture form information), and the determination unit 104 requests the gesture form information from the detection unit 102. Upon receiving the request, the detection unit 102 detects a gesture form based on an image that is used in detection of the pointing position or the like. Then, the detection unit 102 provides the information that represents the detected gesture form to the determination unit 104. Note that the gesture form may be patterned in advance, or classified into, for example, the three patterns illustrated in FIGS. 17A to 17C.

Next, the determination unit 104 sets the manipulation determination time based on the acquired user state information. For example, the determination unit 104 determines to which of predetermined gesture form patterns the gesture form represented by the acquired gesture form information corresponds. For example, the determination unit 104 determines to which of the gesture form patterns illustrated in FIGS. 17A to 17C the gesture pattern represented by the gesture form information corresponds. Then, the determination unit 104 sets the manipulation determination time associated with the determined gesture form pattern. Note that information associated with the gesture form pattern may be a coefficient related to the standard manipulation determination time.

Note that the manipulation determination time associated with the gesture form pattern can be decided based on the distance from the body to a hand of the user, the degree to which the user stretches his or her arm, or the like. For example, the gesture form illustrated in FIG. 17A has a longer distance from the body to the hand of the user and the arm of the user is stretched more than in the gesture forms of FIGS. 17B and 17C. For this reason, the gesture form pattern illustrated in FIG. 17A is set as a pattern related to a gesture form which brings higher accuracy of the pointing position, and thus a longer manipulation determination time than that of other gesture form patterns is associated therewith. In addition, lower accuracy of pointing position is set in the order of the gesture form patterns shown in FIGS. 17B and 17C, and thus the manipulation determination time associated therewith becomes longer.

In addition, when a gesture form which corresponds to a gesture form pattern associated with a longer manipulation determination time than other gesture form patterns is detected, the control unit 106 may perform display control for causing the user to correct his or her gesture form. For example, when the detection unit 102 detects a gesture form which corresponds to the gesture form pattern illustrated in FIG. 17B or 17C, the control unit 106 causes the state in which the accuracy of the pointing position is low to be displayed in the display region. In this case, the accuracy of the pointing position can be improved when the user corrects his or her gesture form, and thus manipulation performance can be improved.

Note that the user state information may be information which represents a position of the user (hereinafter also referred to as user position information). To be specific, the determination unit 104 controls the manipulation determination time according to a position represented by the user position information. For example, as a position of the user is farther from the display region or the imaging device 200, accuracy of the pointing position can be lower. For this reason, the determination unit 104 can set the manipulation determination time as the distance from the display region or the imaging device 200 to the position represented by the user position information becomes longer. In addition, when a position of the user is a predetermined position, the determination unit 104 may set a manipulation determination time different from that when a position of the user is another position.

In addition, the user state information may be information which represents a line of sight of the user (hereinafter also referred to as user line-of-sight information). To be specific, the determination unit 104 controls the manipulation determination time according to the degree of similarity between a line of sight represented by the user line-of-sight information and a pointing direction. For example, when a line of sight of the user is similar to the pointing direction, accuracy of the pointing position can be high. For this reason, the determination unit 104 determines whether a line of sight represented by the user line-of-sight information is similar to a pointing direction detected by the detection unit 102, and when the directions are similar, the manipulation determination time can be shortened.

As described above, the determination unit 104 controls the manipulation determination time based on the information which represents a state of the user. For this reason, as the manipulation determination time is controlled based on a state of the main agent who performs a pointing manipulation that is closely related to accuracy of a pointing position, accuracy in manipulation execution determination increases, and thus manipulation performance can be improved.

In addition, the information which represents a state of the user includes information which represents the form of a motion of the user who points to a position, and the determination unit 104 controls the manipulation determination time according to the form of the motion of the user who points to the position. For this reason, as the manipulation determination time is controlled based on a gesture form of the user which can further affect accuracy in detecting the pointing position, accuracy in manipulation execution determination can be further heightened.

Control of the manipulation determination me based on a characteristic of a user in addition, the determination unit 104 may control the manipulation determination time based on information which represents a characteristic of a user (hereinafter also referred to as user characteristic information). To be specific, the user characteristic information can be information which represents the age, the sex, a physical characteristic, or the like of the user. For example, a child, a female, or a slim user or the like tends to have thin arms, and if the user's arms are thin, accuracy of a pointing position can be low. For this reason, the determination unit 104 determines whether the age or the like represented by the user characteristic information satisfies a predetermined condition, and when the predetermined condition is determined to be satisfied, the manipulation determination time is changed.

In this case, the determination unit 104 controls the manipulation determination time based on the information which represents the characteristic of the user. For this reason, even when user state information is difficult to acquire, the manipulation determination time can be adjusted for each user, and thus manipulation performance can be improved.

Control of the manipulation determination time based on a manipulation history In addition, the determination unit 104 may control the manipulation determination time based on manipulation history information of the user. To be specific, the determination unit 104 controls the manipulation determination time based on a manipulation specified from the manipulation history information of the user, the user who performed the manipulation, a characteristic of the user, an attitude of the user, clothing of the user, or the like. For example, when a manipulation specified from the manipulation history information of the user, for example, a manipulation of which the manipulation frequency or proficiency is higher than another manipulation, is performed, the determination unit 104 sets the manipulation determination time that is shorter than that of the other manipulation. In addition, when a manipulation is performed by a user specified from the manipulation history information of the user, for example, a user whose accuracy of a pointing position is lower than that of another user, the determination unit 104 sets the manipulation determination time that is longer than that of the other user. In addition, when a manipulation is performed by a user who wears clothing specified from the manipulation history information of the user, for example, clothing of which a color, a pattern, or the like brings low accuracy of a pointing position, the determination unit 104 sets the manipulation determination time that is longer than that of a user wearing other clothing.

In this case, the determination unit 104 controls the manipulation determination time based on manipulation history information of a user. For this reason, a manipulation or the like of which accuracy of a pointing position is low is identified, the manipulation determination time is set for each identified manipulation or the like, and thus accuracy in manipulation execution determination is heightened and manipulation performance can be improved.

Control of the manipulation determination time based on an external environment In addition, the determination unit 104 may control the manipulation determination time based on information which represents an external environment of the information processing device 100-2 (hereinafter also referred to as external environment information). To be specific, the external environment information can be information which represents a state of external light such as illuminance of external light or the number of light sources. For example, when illuminance of external light or the number of light sources increases, accuracy of a pointing position can decrease. For this reason, the determination unit 104 determines whether illuminance of external light represented by external environment information is equal to or higher than a threshold value, and when the value represented by the external environment information is equal to or higher than the threshold value, the determination unit sets the manipulation determination time to be longer than when the value is lower than the threshold value. In addition, for example, when illuminance of external light or the like changes or is unstable, accuracy of a pointing position can decrease. For this reason, when a change value or a change rate of illuminance of external light or the like represented by external environment information changes by a value equal to or higher than a threshold value, the determination unit 104 sets the manipulation determination time to be longer than when it changes by a value lower than the threshold value.

In this case, the determination unit 104 controls the manipulation determination time based on information which represents an external environment of the information processing device 100-2. For this reason, it is possible to control performance of unintended manipulation execution determination caused by a change in the external environment that users are not able to affect.

As described above, according to the third modified example of the embodiment, the determination unit 104 controls the manipulation determination time based on accuracy factor information which changes accuracy of a pointing position. For this reason, as the manipulation determination time is controlled in accordance with accuracy of a pointing position, occurrence of manipulation execution determination that does not match the intention of the user can be suppressed, and thus manipulation performance can be improved.

Note that the manipulation determination time specified from user state information, user characteristic information, and external environment information may be optimized through mechanical learning. In addition, in the mechanical learning, a parameter set obtained by combining elements of the information may be generated, and the manipulation determination time may be specified based on the parameter set. For example, when the parameter set satisfies a condition, the determination unit 104 sets the manipulation determination time specified based on the parameter set. The parameter set can be various combinations of the elements, for example, a set of manipulating users and positions of users, a set of gesture forms and ages of users, and the like.

In addition, the user state information, user characteristic information, and external environment information may be generated by the detection unit 102 or the like, or acquired from an external device of the information processing device 100-2 through communication.

Fourth Modified Example

As the fourth modified example of the embodiment, the information processing device 100-2 may control the manipulation determination time based on the number of users. To be specific, when pointing positions related to a plurality of users are detected, the determination unit 104 may lengthen the manipulation determination time. For example, when a plurality of pointing positions are detected, the detection unit 102 performs detection of users who performed the pointing manipulations. Then, when the plurality of users have been detected, the determination unit 104 lengthens the manipulation determination time.

Further, when the distance between process objects of respective pointing positions is in the range of a predetermined distance, the determination unit 104 may lengthen the manipulation determination time. For example, when two or more pointing positions pause on different icons, the determination unit 104 computes the distance between the icons. Then, when the computed distance is in the range of a predetermined value, the determination unit 104 lengthens the manipulation determination time.

As described above, according to the fourth modified example of the embodiment, when pointing positions related to a plurality of users are detected, the determination unit 104 lengthens the manipulation determination time. For this reason, as the manipulation determination time is lengthened in state in which the pointing positions are highly likely to be entangled with each other, a possibility of manipulation execution determination that does not match the intentions of the users being performed can be lowered.

In addition, when the distance between process objects of respective pointing positions related to a plurality of users is in the range of a predetermined distance, the determination unit 104 lengthens the manipulation determination time. For this reason, as the manipulation determination time is lengthened only in a specific circumstance among circumstances in which a plurality of pointing positions are detected, user convenience can be improved while occurrence of manipulation execution determination that does not match the intentions of the users is suppressed.

Fifth Modified Example

As the fifth modified example of the embodiment, the information processing device 100-2 may set the manipulation determination time based on setting information set by a user. To be specific, the determination unit 104 acquires setting information of the manipulation determination time set in advance by a user from a storage unit or the like, and sets the manipulation determination time based on the acquired setting information. The process of the present modified example will be further described in detail with reference to FIG. 18. FIG. 18 is a diagram illustrating an example of a GUI for setting the manipulation determination time displayed by the information processing device 100-2 according to the fifth modified example of the embodiment.

First, when a manipulation related to a setting of the manipulation determination time is performed, the control unit 106 causes the GUI for setting the manipulation determination time to be displayed in the display region. For example, the control unit 106 causes the GUI 3 to be displayed as illustrated in FIG. 18. The manipulation determination time is set according to a position of a manipulation bar of the GUI 3. Note that the set value is stored in the storage unit or the like as setting information of the manipulation determination time. In addition, the set value may be the manipulation determination time, or the difference with an initial value of the manipulation determination time.

Then, the determination unit 104 sets the manipulation determination time based on the setting information of the manipulation determination time stored in the storage unit or the like. Note that the manipulation determination time can be the initial value of the above-described manipulation determination time change process.

As described above, according to the fifth modified example of the embodiment, the determination unit 104 sets the manipulation determination time based on setting information set by a user. For this reason, as an intention of the user is directly reflected in the manipulation determination time, user convenience can be improved.

4. Third Embodiment (Example in Which a Manipulation Determination Region is Changed)

The information processing device 100-2 according to the second embodiment of the present disclosure has been described above. Next, an information processing device 100-3 according to a third embodiment of the present disclosure will be described. The information processing device 100-3 controls a manipulation determination region based on the start of a pause of a pointing position.

4-1. Configuration of an Information Processing Device

A functional configuration of the information processing device 100-3 is substantially the same as that of the first and second embodiments, but the function of the determination unit 104 is partly different. Note that description of functions that are substantially the same as those of the first and second embodiments will be omitted.

The determination unit 104 controls a manipulation determination region based on a pointing position. To be specific, when a pause of a pointing position is started in a manipulation determination region, the determination unit 104 changes the manipulation determination region. The process of the determination unit 104 will be further described in detail with reference to FIG. 19. FIG. 19 is a diagram for describing a change in a manipulation determination region according to the process of the information processing device 100-3 according to the present embodiment. Note that manipulation determination regions are expressed using oblique lines in FIG. 19 and succeeding drawings for the sake of clarity of description.

First, an initial setting for a manipulation determination region is performed based on setting information related to a process object or the like. For example, manipulation determination regions related to the respective icons 20A to 20C can be the display ranges of the respective icons 20A to 20C, i.e., the oblique-lined portions as illustrated in the left drawing of FIG. 19.

Then, when a pause of a pointing position is started in the manipulation determination region, the determination unit 104 changes the manipulation determination region. For example, when the pause of the pointing position represented by the cursor 30 is determined to have started at a position overlapping with the icon 20A as illustrated in the right drawing of FIG. 19, the determination unit 104 widens the manipulation determination region from the display range of the icon to the region 40A which includes the display range.

4-2. Process of the Information Processing Device

Next, the process of the information processing device 100-3 of the present embodiment will be described with reference to FIG. 20. FIG. 20 is a flow chart conceptually showing the process of the information processing device 100-3 according to the present embodiment. Note that description of processes that are substantially the same as those of the first and second embodiments will be omitted.

First, the information processing device 100-3 determines whether a pointing position has been undetected for a predetermined period of time (Step S502), and when a pointing position is detected, it is determined whether a pause of the pointing position has started in a manipulation determination region (Step S504).

When the pause of the pointing position is determined to have started, the information processing device 100-3 changes the manipulation determination region (Step S506). The specific, the determination unit 104 sets the manipulation determination region in which the pause of the pointing position is determined to have started to be wider than the original manipulation determination region Next, the information processing device 100-3 changes display of a manipulation object (Step S508). Then, the information processing device 100-3 determines whether the pause of the pointing position has halted (Step S510), and when the pause of the pointing position is determined not to have halted, it is determined whether the manipulation determination time has elapsed (Step S512). When the manipulation determination time is determined to have elapsed, the information processing device 100-3 performs a manipulation related to the manipulation determination region (Step S514).

As described above, according to the third embodiment of the present disclosure, the information processing device 100-3 changes the manipulation determination region when a pause of the pointing position has started in the manipulation determination region. For this reason, the manipulation determination process can continue even when the pointing position is unintentionally moved due to shaking of a hand or the like for the time from the start of the pause of the pointing position to manipulation determination, and thus manipulation performance can be improved.

4-3. Modified Examples

The third embodiment of the present disclosure has been described. Note that the present embodiment is not limited to the above-described example. Hereinbelow, first and second modified examples of the embodiment will be described.

First Modified Example

As the first modified example of the embodiment, the information processing device 100-3 may change display of a process object related to a manipulation determination region based on a change in the manipulation determination region. To be specific, the determination unit 104 emphasizes display of a process object related to a manipulation determination region based on a change in the manipulation determination region. The process of the present modified example will be further described in detail with reference to FIG. 21. FIG. 21 is a diagram illustrating an example of a display change of a process object resulting from a change in a manipulation determination region according to the process of the information processing device 100-3 according to the first modified example of the embodiment.

First, when a pause of a pointing position is determined to have started in manipulation determination region, the determination unit 104 changes the manipulation determination region. For example, the manipulation determination region related to the icon 20A can be set to the display range of the icon 20A as illustrated in the left drawing of FIG. 21. Then, when the pause of the pointing position on the icon 20A represented by the cursor 30 is determined to have started, the determination unit 104 changes the manipulation determination region to the region 40A as illustrated in the middle drawing of FIG. 21.

In addition, when the manipulation determination region is changed, the control unit 106 changes display of a process object related to the manipulation determination region. For example, when the determination unit 104 changes the manipulation determination region related to the icon 20A, the control unit 106 causes display of the icon 20A to become large as illustrated in the right drawing of FIG. 21. Note that the control unit 106 may change the shape, pattern, color, or the like of the icon 20A. In addition, the control unit 106 may change the icon 20A according to passage of time.

As described above, according to the first modified example of the embodiment, the control unit 106 changes display of a process object related to a manipulation determination region based on a change of the manipulation determination region made by the determination unit 104. For this reason, as the process object related to the change of the manipulation determination region is emphasized to a user, the user can be aware of the changed manipulation determination region, and thus unintended manipulation execution determination can be avoided.

Second Modified Example

As the second modified example of the embodiment, the information processing device 100-3 may give priority to a manipulation determination region in which a pause has started when a plurality of manipulation determination regions overlap. To be specific, when a region in which a plurality of manipulation determination regions overlap overlaps with a pointing position, the determination unit 104 continues the manipulation determination process with respect to the manipulation determination region in which the pause of the pointing position has started. The process of the present modified example will be further described in detail with reference to FIG. 22. FIG. 22 is a diagram for describing the manipulation determination process when manipulation determination regions overlap in the information processing device 100-3 according to the second modified example of the embodiment.

First, the plurality of manipulation determination regions are set to overlap. For example, the manipulation determination regions 40A to 40C related to the icons 20A to 20C can be arranged to overlap as illustrated in the left drawing of FIG. 22.

Then, when a pause of a pointing position is determined to have started in a manipulation determination region, the determination unit 104 starts a manipulation determination process in the manipulation determination region. For example, when the pause of the pointing position represented by the cursor 30 is determined to have started in the manipulation determination region 40A as illustrated in the middle drawing of FIG. 22, the determination unit 104 starts the manipulation determination process in the manipulation determination region 40A.

Next, when the pointing position is moved to a position at which other manipulation determination regions overlap, the determination unit 104 continues the manipulation determination process being executed. For example, when the cursor 30 is moved to a position at which the manipulation determination regions 40A and 40C overlap as illustrated in the right drawing of FIG. 22, the determination unit 104 continues the manipulation determination process related to the manipulation determination region 40A being executed. Note that, when the cursor 30 is moved to a position at which it does not overlap with the manipulation determination region 40A, the determination unit 104 ends the manipulation determination process.

As described above, according to the second modified example of the embodiment, when a region in which a plurality of manipulation determination regions overlap overlaps with a pointing position, the determination unit 104 continues the manipulation determination process with respect to the manipulation determination region in which a pause of the pointing position has started. For this reason, even when display of a process object related to another manipulation determination region is in proximity to the pointing position, it is possible to lower a possibility of manipulation execution determination that does not match an intention of a user being performed.

5. Hardware Configuration of the Information Processing Device According to an Embodiment of the Present Disclosure The embodiments of the present disclosure have been described above. The processes of the information processing device 100 described above are realized through cooperation of software and the hardware of the information processing device 100 to be described below.

FIG. 23 is an explanatory diagram illustrating a hardware configuration of the information processing device 100 according to an embodiment of the present disclosure. As illustrated in FIG. 23, the information processing device 100 includes a central processing unit (CPU) 132, a read-only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing unit and a control unit and realizes an operation of the detection unit 102, the determination unit 104, and the control unit 106 in the information processing device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit 104 in the information processing device 100 is realized by the ROM 134 and the RAM 136. The CPU 132, the ROM 134, and the RAM 136 are mutually connected by an internal bus configured by a CPU bus or the like.

The input device 144 is configured to include an input unit, such as a mouse, a keyboard, a touch panel, a button, a microphone, a switch, and a lever, used for the user to input information, and an input control circuit which generates an input signal based on an input by the user and outputs the input signal to the CPU 132. The user of the information processing device 100 can input various kinds of data or can give an instruction of a processing operation to the information processing device 100 by manipulating the input device 144.

The output device 146 is an example of the projection unit 108 of the information processing device 100, and outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The drive 150 is a reader-writer for storage media, and mounted in the information processing device 100 or attached to the outside. The drive 150 reads information stored in a removable storage medium such as a loaded magnetic disk, optical disc, or magneto-optical disc, or a semiconductor memory, and outputs the information to the RAM 134. In addition, the drive 150 can also write information on the removable storage medium.

The connection port 152 is, for example, a bus connected to an external information processing process or a peripheral device of the information processing device 100. The connection port 152 may be a Universal Serial Bus (USB).

The communication device 154 is, for example, a communication interface configured by a communication device connected to a network. The communication device 154 may be a device corresponding to infrared communication, may be a communication device corresponding to a wireless local area network (LAN), may be a communication device corresponding to Long Term Evolution (LTE), or may be a wired communication device performing communication in a wired manner.

6. Conclusion

According to the first embodiment of the present disclosure above, as display of a display object is changed after the start of a pause, a user is aware of a pause state, and it is possible to prompt the user to perform a manipulation such as maintaining or cancelling the pause state so as to obtain a result that the user intends, in addition, according to the second embodiment of the present disclosure, as the manipulation determination time can be changed according to a state of a pointing manipulation, a manipulation result that matches an intention of the user can be easily obtained, and thus manipulation performance can be improved. In addition, according to the third embodiment of the present disclosure, as the manipulation determination process can be continued even when a pointing position is unintentionally moved due to shaking of a hand for the time from the start of a pause of the pointing position to manipulation determination, manipulation performance can be improved.

It should be understood by those skilled in the art that various modifications, combinations, sub-combinations and alterations may occur depending on design requirements and other factors insofar as they are within the scope of the appended claims or the equivalents thereof.

For example, although the determination unit 104 is set to perform manipulation execution determination after the manipulation determination time has elapsed from the start of a pause of the pointing position in the manipulation determination region in the above embodiments, the present technology is not limited thereto. For example, the determination unit 104 may perform manipulation execution determination after the manipulation determination time has elapsed after the pointing position has come in contact with the manipulation determination region. In this case, the time taken to perform the manipulation execution determination is shortened, which can meet the needs of a user who wants to perform a quick manipulation or the like.

In addition, although the example in which the manipulation object which represents a pointing position is displayed in the display region has been described in the above embodiments, display of the manipulation object may differ from the types of manipulating bodies. For example, the control unit 106 can cause different manipulation objects to be displayed when a hand of a user is closed and open. In addition, the control unit 106 may change display of the manipulation object when a pointing manipulation is performed with a manipulation device, for example, a laser pointer or the like. In this case, as the type of the manipulating body is indicated to the user, the user can know whether it is a manipulation state that matches his or her intention, and thus convenience can be improved.

In addition, when there are a plurality of users, the control unit 106 may cause manipulation objects different for the respective users to be displayed. In this case, each of the plurality of users can discriminate his or her manipulation from manipulations of others, and thus convenience can be improved.

In addition, although the example in which the determination unit 104 performs manipulation execution determination based on a pause of one pointing position has been described in the above embodiments, the determination unit 104 may perform manipulation execution determination based on pauses of two or more pointing positions. To be specific, when the starts of pauses of pointing positions related to one hand and the other hand of a user are determined, the determination unit 104 determines execution or non-execution of a manipulation according to a combination of the pointing positions. For example, the user causes a menu to be displayed using one hand and selects the menu using the other hand. In this case, as the number of executable manipulations increases according to pointing manipulations, convenience can be improved.

In addition, although the example in which only pointing manipulations are performed has been described in the above embodiments, a pointing manipulation may be combined with a manipulation recognized through another interface. For example, a pointing manipulation may be combined with a manipulation using a line of sight, a manipulation using a voice, or the like. In this case, as the number of manipulation patterns increases without increasing complexity of a pointing manipulation, manipulation performance and convenience can both be provided.

In addition, although examples in which the display region is rectangular have been described in the above-described embodiments, the display region may have any of various other shapes such as polygonal, circular, or oval shape.

In addition, although examples in which the information processing device 100 is a device having the projection unit 108 have been described in the above-described embodiments, the information processing device 100 may be an information processing device connected to a separate-bodied projection device. For example, the information processing device 100 may be a server having the detection unit 102, a determination unit 104, and the control unit 106, and installed in a remote place from the imaging device 200 and the separate-bodied projection device.

In addition, although the example in which a pointing position is detected directly based on position-attitude information of a manipulating body at each detection time point has been described in the above embodiment, the pointing position may be detected indirectly based on a change in the position-attitude information of the manipulating body. For example, when a pointing position is not detected, the detection unit 102 detects a pointing position through the process related to the embodiment above. Next, when a pointing position has been detected in the past, the detection unit 102 detects a change and a change amount of the position-attitude information of the manipulating body. Then, when the position-attitude information of the manipulating body is determined to have changed, the detection unit 102 detects a pointing position based on the change amount of the position-attitude information. For example, the detection unit 102 acquires the position-attitude information of the manipulating body from an acceleration sensor, an angular velocity sensor (a gyro sensor), or the like, and detects a change from the position-attitude information of the past.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
a determination unit configured to perform determination of execution or non-execution of a manipulation based on a pause of a manipulation position specified through a manipulation of pointing to a display plane using a manipulating body at a position apart from the display plane; and
a control unit configured to issue a command corresponding to the manipulation when the determination unit determines execution of the manipulation.

(2)

The information processing device according to (1), wherein the control unit changes display of a display object related to the manipulation position according to an elapsed time of the pause before the determination.

(3)

The information processing device according to (2),
wherein the display object includes a manipulation object which represents the manipulation position, and
wherein the control unit changes display of the manipulation object according to the elapsed time of the pause.

(4)

The information processing device according to (3), wherein the control unit changes display of the manipulation object so as to indicate a remaining time until the determination.

(5)

The information processing device according to any one of (2) to (4),
wherein the display object includes a process object which indicates a process to be executed, and
wherein the control unit changes display of the process object specified based on the manipulation position according to an elapsed time of the pause.

(6)

The information processing device according to any one of (2) to (5), wherein the determination unit controls a manipulation determination time from a start of the pause to the determination based on the manipulation position in a manipulation determination region associated with a process object which indicates a process to be executed.

(7)

The information processing device according to (6), wherein the determination unit controls the manipulation determination time based on a positional relation between the manipulation position and a process object related to the manipulation determination region.

(8)

The information processing device according to (6) or (7), wherein the determination unit controls the manipulation determination time according to whether or not a region in which a plurality of manipulation determination regions overlap and the manipulation position overlap.

(9)

The information processing device according to any one of (6) to (8), wherein the determination unit controls the manipulation determination time according to whether or not the manipulation determination region that is outside a display region and the manipulation position overlap.

(10)

The information processing device according to any one of (6) to (9), wherein the determination unit changes the manipulation determination region when the pause has started.

(11)

The information processing device according to (10), wherein the determination unit changes display of a process object related to the manipulation determination region based on the change of the manipulation determination region.

(12)

The information processing device according to (10) or (11), wherein, when a region in which a plurality of manipulation determination regions overlap and the manipulation position overlap, the determination unit continues a process related to the determination with respect to the manipulation determination region in which the pause has started.

(13)

The information processing device according to any one of (6) to (12), wherein the determination unit controls the manipulation determination time based on accuracy factor information which changes accuracy of the manipulation position.

(14)

The information processing device according to (13),
wherein the accuracy factor information includes information which represents a state of a user, and
wherein the determination unit controls the manipulation determination time based on the information which indicates the state of the user.

(15)

The information processing device according to (14),
wherein the information which indicates the state of the user includes information which represents a form of a motion of the user who points to a position, and
wherein the determination unit controls the manipulation determination time according to the form of the motion of the user who points to the position.

(16)

The information processing device according to (13),
wherein the accuracy factor information includes manipulation history information of a user, and
wherein the determination unit controls the manipulation determination time based on the manipulation history information of the user.

(17)

The information processing device according to any one of (6) to (16),
wherein the manipulation includes display of a menu which includes a process object, and
wherein a first manipulation determination region of a process object related to a process having a higher priority than another process is preferentially arranged over a second manipulation determination region of another process object.

(18)
The information processing device according to (17), wherein the first manipulation determination region is arranged at a position closer to a center of the menu than a position of the second manipulation determination region, and the first manipulation determination region is larger than the second manipulation determination region.

(19)
The information processing device according to any one of (1) to (18), in which a detection unit which detects a direction pointed in by a motion of a user is further included, and when a palm of the user is open toward a display region, the detection unit detects a direction of a perpendicular line to a plane formed by the palm which is a direction of the perpendicular line toward the display region as a direction pointed in by an attitude of the user.

(20)
An information processing method including:
performing determination of execution or non-execution of a manipulation based on a pause of a manipulation position specified through a manipulation of pointing to a display plane using a manipulating body at a position apart from the display plane; and
issuing a command corresponding to the manipulation when execution of the manipulation is determined.

(21)
A program for causing a computer to execute:
a determination function of performing determination of execution or non-execution of a manipulation based on a pause of a manipulation position specified through a manipulation of pointing to a display plane using a manipulating body at a position apart from the display plane; and
a control function of issuing a command corresponding to the manipulation when the execution of the manipulation is determined in the determination function.

(22)
An information processing apparatus comprising:
circuitry configured to
execute a process related to displayed content located inside of a boundary of a display region, based on a detection result of detecting that a pointing position remains substantially stationary in relation to the displayed content for a predetermined duration of time,
wherein the pointing position is determined based on a location of a target whose position is indicated by a trajectory of a pointing operation made by a user.

(23)
The information processing apparatus according to (22), wherein the circuitry is further configured to initiate a providing of an indicator to indicate to the user a length of time the pointing position has remained substantially stationary in relation to the displayed content.

(24)
The information processing apparatus according to claim any one of (22) or wherein the indicator is a visual notification,

(25)
The information processing apparatus according to any one of (22) to (24), wherein the indicator is displayed at a location that corresponds to the pointing position.

(26)
The information processing apparatus according to any one of (22) to, (25) wherein the indicator comprises an icon.

(27)
The information processing apparatus according to any one of (22) to (26), wherein the predetermined duration of time is changed based on location of the pointing position.

(28)
The information processing apparatus according to any one of (22) to (27), wherein the executed process comprises a changing of the displayed content.

(29)
The information processing apparatus according to any one of (22) to (28), wherein the executed process includes execution of an application program related to the displayed content.

(30)
The information processing apparatus according to any one of (22) to (29), wherein the pointing position is located at an intersection of the trajectory of the pointing operation and a plane that corresponds to the display region.

(31)
The information processing apparatus according to any one of (22) to (30), wherein the pointing position is located along the trajectory of the pointing operation within a plane that corresponds to the display region.

(32)
The information processing apparatus according to any one of (22) to (31), wherein the process is executed based on a detection result of detecting that a plurality of pointing positions are respectively remaining substantially stationary.

(33)
The information processing apparatus according to any one of (22) to (32), wherein the trajectory of the pointing operation corresponds to a line of sight of the user.

(34)
The information processing apparatus according to any one of (22) to (33), wherein the pointing operation is made by the user from a location that is remote from the location of the target.

(35)
The information processing apparatus according to any one of (22) to (34), wherein the pointing operation does not touch or come into proximity to the display region.

(36)
The information processing apparatus according to any one of (22) to (35), wherein location of the pointing position changes in correspondence with a changing of the trajectory of the pointing operation.

(37)
The information processing apparatus according to any one of (22) to (36), wherein an icon is displayed at the pointing position when the pointing position is located inside of the boundary of the display region.

(38)
The information processing apparatus according to any one of (22) to (37), wherein the pointing operation is made for manipulation of a display object that is displayed inside of the boundary of the display region.

(39)
The information processing apparatus according to any one of (22) to (38), wherein the circuitry executes the process based further on a voice input.

(40)
An information processing method comprising:
detecting that a pointing position remains substantially stationary in relation to a displayed content for a predetermined duration of time; and executing, based on a detection result of the detecting, a process related to displayed content located inside of the boundary of the display region,
wherein the pointing position is determined based on a location of a target whose position is indicated by a trajectory of a pointing operation made by a user.

(41)
A non-transitory computer-readable medium having embodied thereon a program, which when executed by a computer causes the computer to execute an information processing method, the method comprising:
detecting that a pointing position remains substantially stationary in relation to a displayed content for a predetermined duration of time; and
executing, based on a detection result of the detecting, a process related to displayed content located inside of the boundary of the display region,
wherein the pointing position is determined based on a location of a target whose position is indicated by a trajectory of a pointing operation made by a user.

REFERENCE SIGNS LIST 1 display region
10 pointing position
20 icon
30 cursor
100 information processing device
102 detection unit
104 determination unit
106 control unit
108 projection unit
200 imaging device

The invention claimed is:

1. An information processing apparatus comprising:
circuitry configured to
execute a process related to displayed content located inside of a boundary of a display region, based on a detection result of detecting that a pointing position remains substantially stationary in relation to the displayed content for a predetermined duration of time,
wherein the pointing position is determined based on a location of a target whose position is indicated by a trajectory of a pointing operation made by a user for manipulation of a display object that is displayed inside of the boundary of the display region, and
wherein the predetermined duration of time is changed based on a positional relation between a location of the pointing position and a location of the display object.

2. The information processing apparatus of claim 1, wherein the circuitry is further configured to initiate a providing of an indicator to indicate to the user a length of time the pointing position has remained substantially stationary in relation to the displayed content.

3. The information processing apparatus of claim 2, wherein the indicator is a visual notification.

4. The information processing apparatus of claim 2, wherein the indicator is displayed at a location that corresponds to the pointing position.

5. The information processing apparatus of claim 4, wherein the indicator comprises an icon.

6. The information processing apparatus of claim 1, wherein the predetermined duration of time is changed based on overlapping or non-overlapping of the pointing position and the display object.

7. The information processing apparatus of claim 1, wherein the executed process comprises a changing of the displayed content.

8. The information processing apparatus of claim 1, wherein the executed process includes execution of an application program related to the displayed content.

9. The information processing apparatus of claim 1, wherein the pointing position is located at an intersection of the trajectory of the pointing operation and a plane that corresponds to the display region.

10. The information processing apparatus of claim 1, wherein the pointing position is located along the trajectory of the pointing operation within a plane that corresponds to the display region.

11. The information processing apparatus of claim 1, wherein the process is executed based on a detection result of detecting that a plurality of pointing positions are respectively remaining substantially stationary.

12. The information processing apparatus of claim 1, wherein the trajectory of the pointing operation corresponds to a line of sight of the user.

13. The information processing apparatus of claim 1, wherein the pointing operation is made by the user from a location that is remote from the location of the target.

14. The information processing apparatus of claim 1, wherein the pointing operation does not touch or come into proximity to the display region.

15. The information processing apparatus of claim 1, wherein the location of the pointing position changes in correspondence with a changing of the trajectory of the pointing operation.

16. The information processing apparatus of claim 1, wherein an icon is displayed at the pointing position when the pointing position is located inside of the boundary of the display region.

17. The information processing apparatus of claim 1, wherein the circuitry executes the process based further on a voice input.

18. An information processing method comprising:
detecting that a pointing position remains substantially stationary in relation to a displayed content for a predetermined duration of time; and
executing, based on a detection result of the detecting, a process related to displayed content located inside of a boundary of a display region,
wherein the pointing position is determined based on a location of a target whose position is indicated by a trajectory of a pointing operation made by a user for manipulation of a display object that is displayed inside of the boundary of the display region, and
wherein the predetermined duration of time is changed based on a positional relation between a location of the pointing position and a location of the display object.

19. A non-transitory computer-readable medium having embodied thereon a program, which when executed by a computer causes the computer to execute an information processing method, the method comprising:
detecting that a pointing position remains substantially stationary in relation to a displayed content for a predetermined duration of time; and
executing, based on a detection result of the detecting, a process related to displayed content located inside of a boundary of a display region,
wherein the pointing position is determined based on a location of a target whose position is indicated by a trajectory of a pointing operation made by a user for manipulation of a display object that is displayed inside of the boundary of the display region, and wherein the predetermined duration of time is changed based on a positional relation between a location of the pointing position and a location of the display object.

20. The information processing apparatus of claim 6, wherein, when the pointing position is overlapping with the display object, the predetermined duration of time is set to a first time, and wherein, when the pointing position is non-overlapping with the display object, the predetermined duration of time is set to a second time longer than the first time.

* * * * *